US011654615B2

(12) United States Patent
Jeol et al.

(10) Patent No.: US 11,654,615 B2
(45) Date of Patent: May 23, 2023

(54) METHOD FOR MANUFACTURING A THREE-DIMENSIONAL OBJECT

(71) Applicant: SOLVAY SPECIALTY POLYMERS USA, LLC, Alpharetta, GA (US)

(72) Inventors: Stéphane Jeol, Cumming, GA (US); Nancy J. Singletary, Alpharetta, GA (US); Ryan Hammonds, Atlanta, GA (US); Hai Van, Norcross, GA (US); David B. Thomas, Milan (IT)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 271 days.

(21) Appl. No.: 16/771,702

(22) PCT Filed: Dec. 19, 2018

(86) PCT No.: PCT/EP2018/086033
§ 371 (c)(1),
(2) Date: Jun. 11, 2020

(87) PCT Pub. No.: WO2019/129595
PCT Pub. Date: Jul. 4, 2019

(65) Prior Publication Data
US 2021/0069963 A1 Mar. 11, 2021

Related U.S. Application Data

(60) Provisional application No. 62/610,559, filed on Dec. 27, 2017.

(30) Foreign Application Priority Data

Feb. 21, 2018 (EP) .................................... 18157929

(51) Int. Cl.
| | |
|---|---|
| B29C 64/118 | (2017.01) |
| B33Y 10/00 | (2015.01) |
| B33Y 30/00 | (2015.01) |
| B33Y 80/00 | (2015.01) |
| B33Y 70/10 | (2020.01) |
| C08L 65/02 | (2006.01) |
| C08L 71/12 | (2006.01) |
| C08L 79/08 | (2006.01) |
| C08L 81/06 | (2006.01) |

(52) U.S. Cl.
CPC ............ B29C 64/118 (2017.08); B33Y 10/00 (2014.12); B33Y 30/00 (2014.12); B33Y 70/10 (2020.01); B33Y 80/00 (2014.12); C08L 65/02 (2013.01); C08L 71/12 (2013.01); C08L 79/08 (2013.01); C08L 81/06 (2013.01); *C08G 2261/312* (2013.01)

(58) Field of Classification Search
CPC ....... B29C 64/118; B29C 67/00; B33Y 10/00; B33Y 30/00; B33Y 70/10; B33Y 80/00; C08L 65/02; C08L 71/12; C08L 79/08; C08L 81/06; C08L 65/00; C08L 71/00; C08L 81/00; C08G 2261/312
See application file for complete search history.

(56) References Cited

U.S. PATENT DOCUMENTS

| | | | |
|---|---|---|---|
| 6,495,615 B1 * | 12/2002 | Gallucci | .................... B29B 9/14 523/210 |
| 2003/0004280 A1 * | 1/2003 | Gallucci | ................. C08L 77/00 525/419 |
| 2005/0048299 A1 * | 3/2005 | Gallucci | ................... C08K 5/42 428/473.5 |
| 2008/0312387 A1 | 12/2008 | El-Hibri et al. | |
| 2011/0104417 A1 * | 5/2011 | Wang | ...................... C08L 79/08 521/134 |
| 2016/0122541 A1 * | 5/2016 | Jaker | .................... B29C 64/106 525/392 |
| 2016/0271880 A1 | 9/2016 | Bheda et al. | |
| 2016/0297935 A1 | 10/2016 | Reese et al. | |
| 2017/0057155 A1 | 3/2017 | Barnes et al. | |
| 2017/0133252 A1 | 5/2017 | Fung et al. | |

FOREIGN PATENT DOCUMENTS

| | | |
|---|---|---|
| CN | 103143706 A1 | 6/2013 |
| DE | 102015222384 A1 | 5/2017 |
| EP | 436111 A2 | 7/1991 |
| JP | 2007023094 A | 2/2007 |
| WO | 2006094988 A2 | 9/2006 |
| WO | 2007101852 A2 | 9/2007 |
| WO | 2008028695 A1 | 3/2008 |
| WO | 2009034086 A2 | 3/2009 |
| WO | 14089708 A1 | 6/2014 |
| WO | 2014086744 A1 | 6/2014 |
| WO | 16134224 A1 | 8/2016 |

(Continued)

OTHER PUBLICATIONS

ASTM D3418-03—Standard Test Method for Transition Temperatures of Polymers by Differential Scanning Calorimetry, 2003, 7 pages.

*Primary Examiner* — Nahida Sultana
(74) *Attorney, Agent, or Firm* — Osha Bergman Watanabe & Burton LLP

(57) ABSTRACT

A method for manufacturing a three-dimensional (3D) object with an additive manufacturing system, comprising a step consisting in printing layers of the 3D object from the part material comprising a polymeric component comprising, based on the total weight of the polymeric component: from 5 to 95 wt. % of at least one polymer (P1) comprising at least 50 mol. % of recurring units (R1) consisting of an arylene group comprising at least one benzene ring, each recurring unit (R1) being bound to each other through C—C bonds, wherein the recurring units (R1) are such that, based on the total number of moles of recurring units (R1):less than 90 mol. % are rigid rod-forming arylene units (R1-a), and at least 10 mol. % are kink-forming arylene units (R1-b), and from 5 to 95 wt. % of at least one polymer (P2), having a glass transition temperature (Tg) between 140° C. and 265° C., and no melting peak, as measured by differential scanning calorimetry (DSC) according to ASTM D3418.

30 Claims, No Drawings

(56) References Cited

FOREIGN PATENT DOCUMENTS

| WO | 16167770 A1 | 10/2016 |
| WO | 17039596 A1 | 3/2017 |
| WO | 2017167691 A1 | 10/2017 |
| WO | 2017167692 A1 | 10/2017 |
| WO | 2018224246 A1 | 12/2018 |

* cited by examiner

METHOD FOR MANUFACTURING A THREE-DIMENSIONAL OBJECT

RELATED APPLICATIONS

This application is a U.S. national stage entry under 35 U.S.C. § 371 of International Application No. PCT/EP2018/086033 filed Dec. 19, 2018, which claims priority to U.S. provisional application 62/610,559 filed on Dec. 27, 2017 and to European application 18157929.3 filed on Feb. 21, 2018, the whole content of each of these applications being incorporated herein by reference for all purposes.

TECHNICAL FIELD

The present disclosure relates to a method for manufacturing three-dimensional (3D) objects using an additive manufacturing system, wherein the 3D object is printed from a part material comprising at least one polymer (P1) comprising at least 50 mol. % of recurring units (R1) consisting of an arylene group comprising one benzene ring or several benzene rings bound to each other through C—C bonds which are linear C—C bonds and kink-forming C—C bonds, and at least one polymer (P2), having a glass transition temperature (Tg) between 140° C. and 265° C., and no melting peak (as measured by differential scanning calorimetry (DSC) according to ASTM D3418). In particular, the present disclosure relates to a part material incorporating such polymer (P1) and polymer (P2), for example in the form of filaments, for use in additive manufacturing systems to print 3D objects.

BACKGROUND ART

Additive manufacturing systems are used to print or otherwise build 3D parts from digital representations of the 3D parts using one or more additive manufacturing techniques. Examples of commercially available additive manufacturing techniques include extrusion-based techniques, selective laser sintering, powder/binder jetting, electron-beam melting and stereolithography processes. For each of these techniques, the digital representation of the 3D part is initially sliced into multiple horizontal layers. For each sliced layer, a tool path is then generated, which provides instructions for the particular additive manufacturing system to print the given layer.

For example, in an extrusion-based additive manufacturing system, a 3D part may be printed from a digital representation of the 3D part in a layer-by-layer manner by extruding and adjoining strips of a part material. The part material is extruded through an extrusion tip carried by a print head of the system, and is deposited as a sequence of roads on a platen in an x-y plane. The extruded part material fuses to previously deposited part material, and solidifies upon a drop in temperature. The position of the print head relative to the substrate is then incremented along a z-axis (perpendicular to the x-y plane), and the process is then repeated to form a 3D part resembling the digital representation. An example of extrusion-based additive manufacturing system starting from filaments is called Fused Filament Fabrication (FFF), also known as Fused Deposition Modelling (FDM). Pellet Additive Manufacturing (PAM) is an example of a 3D printing method capable of printing raw materials as pellets.

US 2016122541 (Stratasys) relates to additive manufacturing systems for printing 3D parts and support structures. The support material adheres to the part material during fabrication, and is removable from the completed 3D part when the printing process is complete. The support material includes a base resin having one or more thermoplastic polymers, for example a polymer blend of 90 wt. % of PES (ULTRASON E1010 from BASF) and 10 wt. % of a blend of polyphenyleneoxide and polystyrene (PPO/PS) ("NORYL 731" from SABIC).

One of the fundamental limitations associated with known additive manufacturing methods is based on the lack of identification of a part material based on polymeric components which allows obtaining a resulting 3D part with acceptable mechanical properties.

There is therefore a need for polymeric part material to be used in additive manufacturing systems, for example FFF or PAM printing methods, which make possible the manufacture of 3D objects presenting improved set of mechanical properties (e.g. modulus and tensile properties such as tensile strength and elongation).

SUMMARY OF INVENTION

An aspect of the present invention is directed to a method for manufacturing a three-dimensional (3D) object with an additive manufacturing system, comprising a step consisting in printing layers of the three-dimensional object from the part material comprising a polymeric component comprising, based on the total weight of the polymeric component:
  from 5 to 95 wt. % of at least one polymer (P1) comprising at least 50 mol. % of recurring units (R1) consisting of an arylene group comprising at least one benzene ring, each recurring unit (R1) being bound to each other through C—C bonds (E1), wherein the recurring units (R1) are such that, based on the total number of moles of recurring units (R1):
    less than 90 mol. % are rigid rod-forming arylene units (R1-a), and
    at least 10 mol. % are kink-forming arylene units (R1-b),
  from 5 to 95 wt. % of at least one polymer (P2), having a glass transition temperature (Tg) between 140° C. and 265° C., and no melting peak, as measured by differential scanning calorimetry (DSC) according to ASTM D3418.

According to an embodiment, the method also includes the extrusion of the part material, with an extrusion-based additive manufacturing system, also known as fused filament fabrication technique (FFF) and as Pellet Additive Manufacturing technique (PAM).

Another aspect of the invention is directed to a part material comprising at least one polymeric component comprising at least one polymer (P1) comprising at least 50 mol. % of recurring units (R1) as defined herein, and at least one polymer (P2), having a glass transition temperature (Tg) between 140° C. and 265° C., and no melting peak, as measured by differential scanning calorimetry (DSC) according to ASTM D3418.

Another aspect yet of the present invention is directed to the use of the herein described part material for the manufacture of three-dimensional objects or for the manufacture of a filament for use in the manufacture of three-dimensional objects.

The applicant has found that the combination of polymer (P1) and polymer (P2) makes possible the manufacture of 3D objects presenting improved mechanical properties (e.g. modulus and tensile strength).

The 3D objects or articles obtainable by such method of manufacture can be used in a variety of final applications.

Mention can be made in particular of implantable device, dental prostheses, brackets and complex shaped parts in the aerospace industry and under-the-hood parts in the automotive industry.

DESCRIPTION OF EMBODIMENTS

The present invention relates to a method for manufacturing a three-dimensional (3D) object with an additive manufacturing system, such as an extrusion-based additive manufacturing system (for example FFF).

The method of the present invention comprises a step of printing layers of the three-dimensional (3D) object from a part material. The part material may be in the form of filaments and be used in extrusion-based additive manufacturing system starting from filaments, called Fused Filament Fabrication (FFF), also known as Fused Deposition Modelling (FDM). The part material may also be in the form of pellets and be used in a 3D printing technology capable of printing raw materials as pellets (PAM).

The merit of the applicant has been to surprisingly identify a combination of both a polymer (P1) with good mechanical properties and an amorphous polymer (P2), which makes possible the manufacture of 3D objects having a good mechanical property profile (i.e. tensile strength and modulus of elasticity).

The expression "polymer" or "copolymer" is hereby used to designate homopolymers containing substantially 100 mol. % of the same recurring units and copolymers comprising at least 50 mol. % of the same recurring units, for example at least about 60 mol. %, at least about 65 mol. %, at least about 70 mol. %, at least about 75 mol. %, at least about 80 mol. %, at least about 85 mol. %, at least about 90 mol. %, at least about 95 mol. % or at least about 98 mol. %.

The expression "part material" hereby refers to a blend of material, notably polymeric compounds, intended to form at least a part of the 3D object. The part material is according to the present invention used as feedstocks to be used for the manufacture of 3D objects or part of 3D objects.

The method of the present invention employs two distinct polymers as main elements of the part material, which can for example be shaped in the form of filaments or microparticles (with a regular shape such as spheres, or with a complex shape obtained by grinding/milling of pellets), to build a 3D object (e.g. a 3D model, a 3D article or a 3D part). The polymers may also be printed in the form of pellets.

In the present application:
any description, even though described in relation to a specific embodiment, is applicable to and interchangeable with other embodiments of the present invention;
where an element or component is said to be included in and/or selected from a list of recited elements or components, it should be understood that in related embodiments explicitly contemplated here, the element or component can also be any one of the individual recited elements or components, or can also be selected from a group consisting of any two or more of the explicitly listed elements or components; any element or component recited in a list of elements or components may be omitted from such list; and
any recitation herein of numerical ranges by endpoints includes all numbers subsumed within the recited ranges as well as the endpoints of the range and equivalents.

According to an embodiment, the part material is in the form of a filament. The expression "filament" refers to a thread-like object or fiber formed of a material or blend of materials which according to the present invention comprises polymer (P1) and polymer (P2).

The filament may have a cylindrical or substantially cylindrical geometry, or may have a non-cylindrical geometry, such as a ribbon filament geometry; further, filament may have a hollow geometry, or may have a core-shell geometry, with another polymeric composition, being used to form either the core or the shell.

According to an embodiment of the invention, the method for manufacturing a three-dimensional object with an additive manufacturing system comprises a step consisting in extruding the part material. This step may for example occurs when printing or depositing strips or layers of part material. The method for manufacturing 3D objects with an extrusion-based additive manufacturing system is also known as fused filament fabrication technique (FFF), as well as Pellet Additive Manufacturing technique (PAM).

FFF 3D printers are, for example, commercially available from Apium, from Roboze, from Hyrel or from Stratasys, Inc. (under the trade name Fortus®). SLS 3D printers are, for example, available from EOS Corporation under the trade name EOSINT® P. FRTP 3D printers are, for example, available from Markforged.

PAM 3D printers are, for example, commercially available from Pollen. BAAM (Big Area Additive Manufacturing) is an industrial sized, additive machine commercially available from Cincinnati Inc.

Part Material

The part material employed in the method of the present invention comprises a polymeric component comprising, based on the total weight of the polymeric component:
from 5 to 95 wt. % of at least one polymer (P1) comprising at least 50 mol. % of recurring units (R1) consisting of an arylene group comprising at least one benzene ring, recurring units (R1) being bound to each other through C—C bonds, for example linear C—C bonds (E1) and kink-forming C—C bond (E2), and
from 5 to 95 wt. % of at least one polymer (P2), having a glass transition temperature (Tg) between 140° C. and 265° C., and no melting peak, as measured by differential scanning calorimetry (DSC) according to ASTM D3418.

The part material of the invention may include other components. For example the part material may comprise at least one additive, notably at least one additive selected from the group consisting of fillers, colorants, lubricants, plasticizers, stabilizers, flame retardants, nucleating agents, flow enhancers and combinations thereof. Fillers in this context can be reinforcing or non-reinforcing in nature.

In embodiments that include fillers, the concentration of the fillers in the part material ranges from 0.1 wt. % to 60 wt. %, with respect to the total weight of the part material. Suitable fillers include calcium carbonate, magnesium carbonate, glass fibers, graphite, carbon black, carbon fibers, carbon nanofibers, graphene, graphene oxide, fullerenes, talc, wollastonite, mica, alumina, silica, titanium dioxide, kaolin, silicon carbide, zirconium tungstate, boron nitride and combinations thereof.

According to one embodiment, the part material of the present invention comprises:
a polymeric component comprising from 5 to 95 wt. % of at least the polymer (P1) and from 5 to 95 wt. % of at least the polymer (P2), and
up to 60 wt. % of at least one additive, for example selected from the group consisting of fillers, colorants, lubricants, plasticizers, flame retardants, nucleating agents, flow enhancers and stabilizers, based on the total weight of the part material.

According to another embodiment, the part material of the present invention consists essentially of:
- a polymeric component comprising from 5 to 95 wt. % of at least the polymer (P1) and from 5 to 95 wt. % of at least the polymer (P2), and
- from 0 to 60 wt. %, from 0.1 to 50 wt. % or from 0.5 to 40 wt. % of at least one additive selected from the group consisting of fillers, colorants, lubricants, plasticizers, flame retardants, nucleating agents, flow enhancers and stabilizers, based on the total weight of the part material.

According to an embodiment, the polymeric component of the part material comprises:
- from 5 to 95 wt. % of at least one polymer (P1), for example from 6 to 80 wt. %, from 6.5 to 70 wt. % from 7 to 60 wt. %, from 7.5 to 50 wt. % or from 8 to 45 wt. %, and/or
- from 5 to 95 wt. % of at least one polymer (P2), for example from 20 to 94 wt. %, from 30 to 93.5 wt. % from 40 to 93 wt. %, from 50 to 92.5 wt. % or from 55 to 92 wt. %, based on the total weight of the polymeric component in the part material.

Polymer (P1)

According to the present invention, the polymer (P1) comprises at least 50 mol. % of recurring units (R1).

Recurring units (R1) consist of an arylene group comprising at least one benzene ring (i.e. one benzene ring or several benzene rings), substituted or not. Recurring units (R1) are bound to each other through:
- linear C—C bonds (E1), also called herein rigid rod-forming arylene units (R1-a), e.g. 1,4- or para-substitution on phenylene cycle, and
- kink-forming C—C bonds (E2), also called herein kink-forming arylene units (R1-b), e.g. 1,2- or ortho-substitution on phenylene cycle or e.g. 1,3- or meta-substitution on phenylene cycle).

More precisely, the recurring units (R1) are such that:
- less than 90 mol. % are rigid rod-forming arylene units (R1-a), and
- at least 10 mol. % are kink-forming arylene units (R1-b), based on the total number of moles of recurring units (R1).

According to an embodiment of the present invention, the polymer (P1) comprises at least 60 mol. % of recurring units (R1) as above defined, at least 70 mol. %, at least 80 mol. %, at least 90 mol. %, at least 95 mol. %, at least 99 mol. % of recurring units (R1) as above defined.

According to an embodiment of the present invention, the polymer (P1) is a homopolymer and consists of 100 mol. % of recurring units (R1) as above defined.

According to an embodiment of the present invention, the polymer (P1) is a polyphenylene polymer.

Recurring Units (R1-a)

Non limitative examples of an arylene group of the recurring units (R1-a) include:

1,4-phenylene (also named p-phenylene) 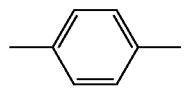

1,4-naphthylene 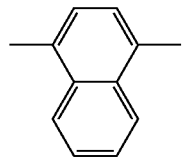

1,4-phenanthrylene and 2,7-phenanthrylene 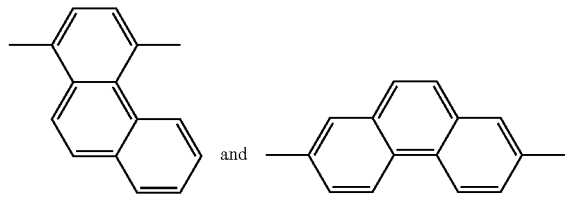

1,4-anthrylene and 9,10-anthrylene 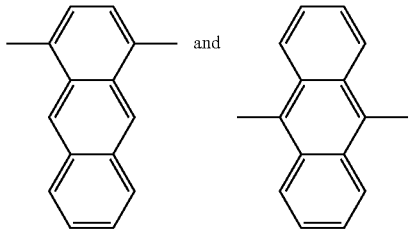

2,7-pyrenylene 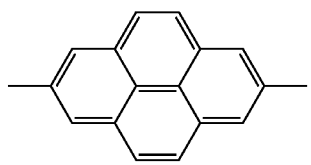

-continued
1,4-naphthacenylene
And
5,12-naphthacenylene
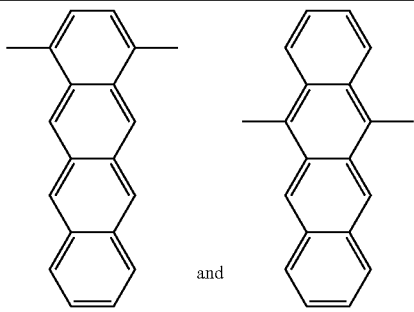
and
1,4-chrysenylene
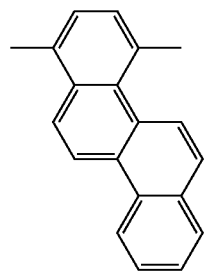 [SMILES: Cc1ccc(C)c2c1ccc1c3ccccc3ccc12]
1,4-triphenylylene
and 2,7-triphenylylene
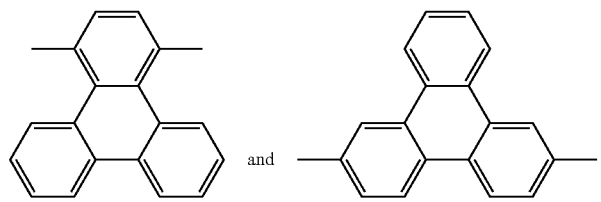
and
1,4-pentacenylene,
5,14-pentacenylene
and 6,13-pentacenylene
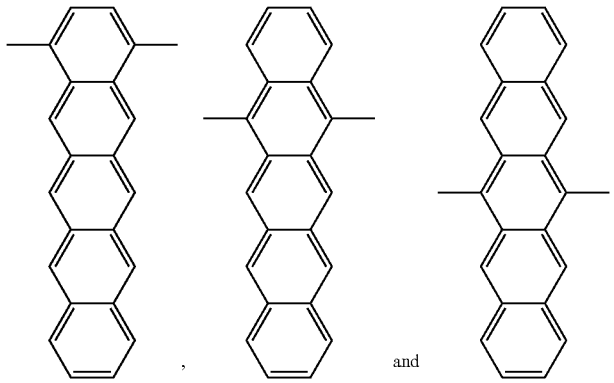
, and
1,6-coronenylene
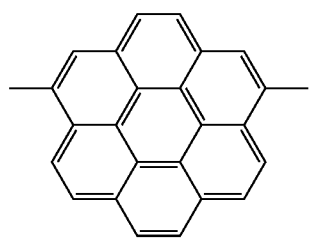

-continued
| | |
|---|---|
| 1,4-trinaphthylenylene, 2,9-trinaphthylenylene And 5,18-trinaphthylenylene | 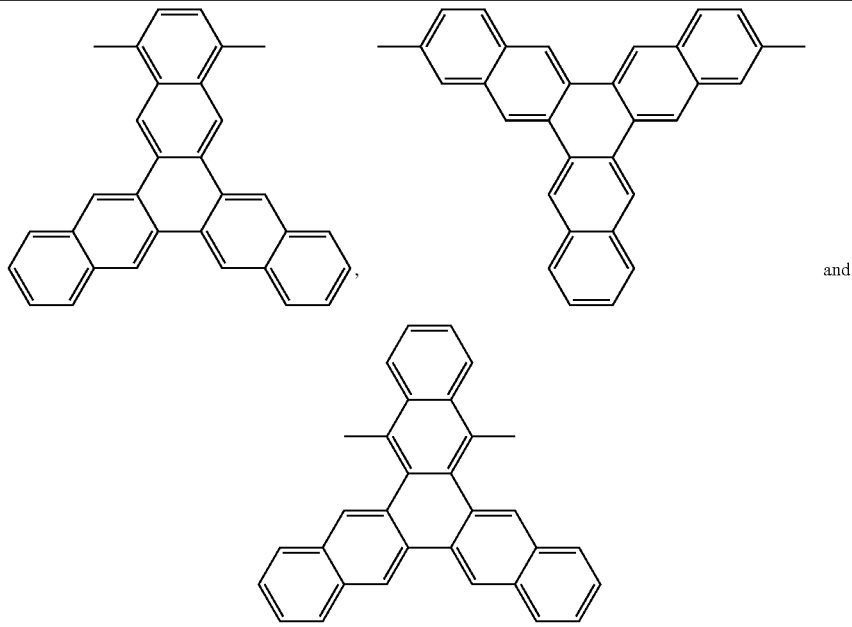 |
Recurring Units (R1-b)
Non limitative examples of an arylene group of the recurring units (R1-b) include:
| | |
|---|---|
| 1,2-phenylene (or o-phenylene) | 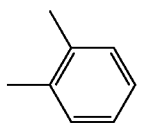 |
| 1,2-, 2,3- and 1,7-naphthylenes | 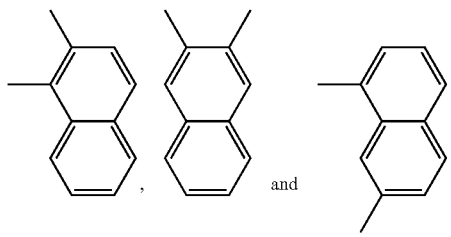 |
| 1,2-, 1,8-, 1,9-, 2,3-, 2,5- and 2,10-phenanthrylenes | 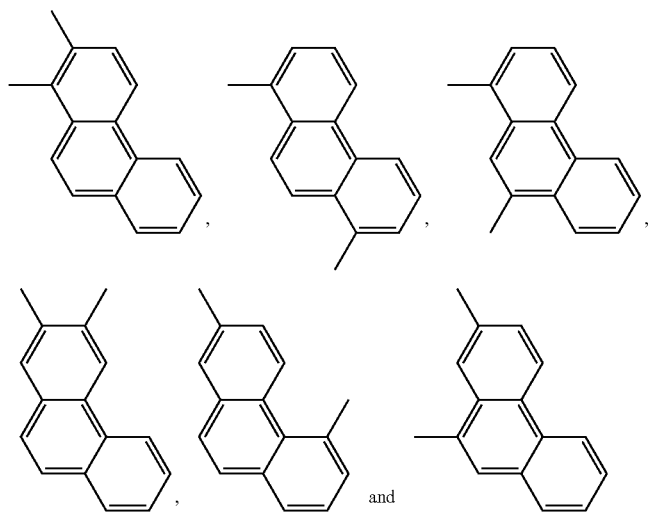 |

-continued
1,2- and 1,7-anthrylenes
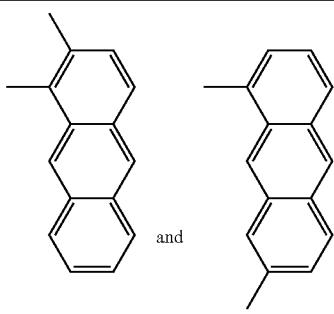
1,3-phenylene (or m-phenylene)
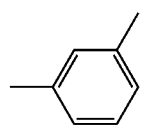
1,3- and 1,6-naphtylenes
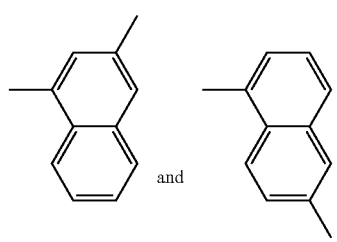
1,3-, 1,5-, 1,7-, 2,4-, 2,9- and 3,10- phenanthrylenes
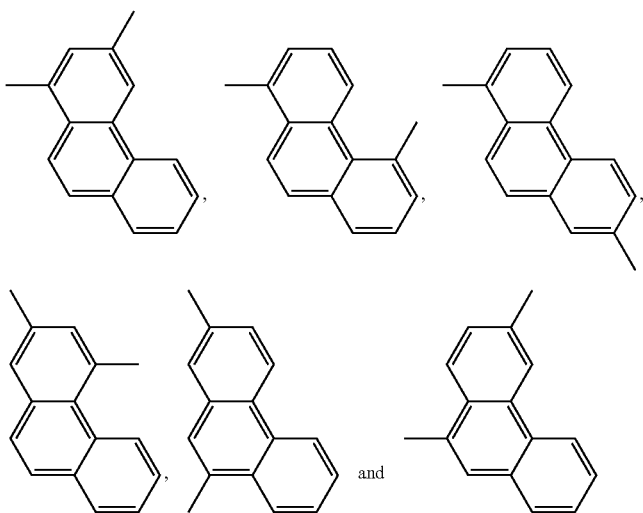
1,3- and 1,6-anthrylenes
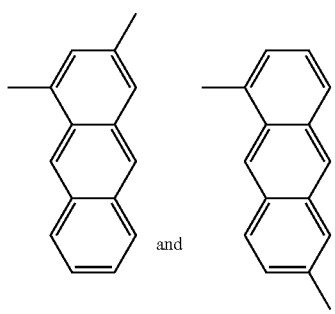

-continued 1,8-naphthylene

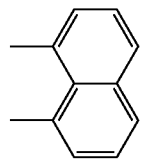

1,10- and 3,5-phenanthrylenes

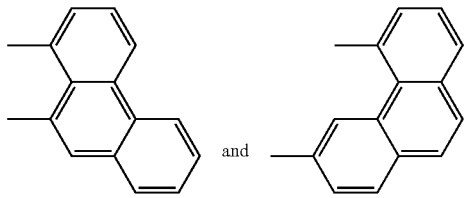
and 1,8- and 1,9-anthrylenes

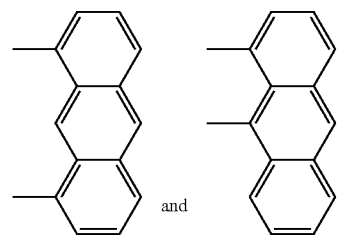
and 1,5- and 2,6-naphtylenes

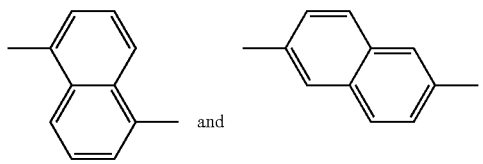
and 1,6-, 3,9- and 4,10-phenanthrylenes

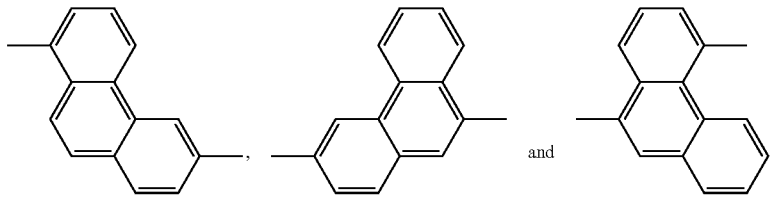
, and 1,5-, 1,10- and 2,6-anthrylenes

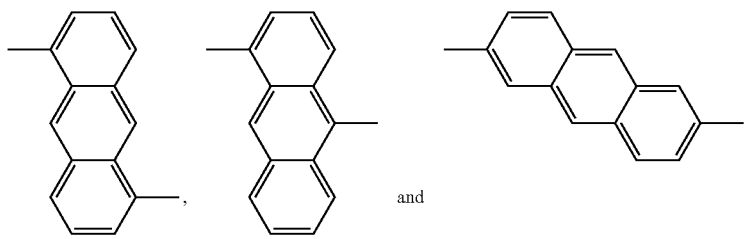
, and

According to an embodiment, the arylene group of the recurring units (R1-a) and (R1-b) is composed of less than 3 benzene rings, for example 1, 2 or 3 benzene rings. Preferably, the arylene group of the recurring units (R1-a) and (R1-b) is composed of less than 2 benzene rings. More preferably, the arylene group of the recurring units (R1-a) and (R1-b) is composed of one benzene rings.

The arylene group may be substituted or unsubstituted. When it is substituted, it can be substituted by a monovalent substituting group, preferably a non-polymeric group of molecular weight less than 500 g/mol, les then 300 g/mol, less than 200 g/mol or less than 150 g/mol.

According to an embodiment, the polymer (P1) comprises at least 50 mol. % of recurring units (R1), bound to each other through C—C bonds, such that, based on the total number of moles of recurring units (R1):
  less than 90 mol. % are arylene units (R1-a) of formula:

—Ar$_1$— wherein:
    Ar$_1$ is substituted or not,
    Ar$_1$ is selected from the group consisting of 1,4-phenylene (or p phenylene), 1,4-naphthylene, 1,4-phenanthrylene, 2,7 phenanthrylene, 1,4-anthrylene, 9,10 anthrylene, 2,7-pyrenylene, 1,4-naphthacenylene, 5,12 naphthacenylene, 1,4-chrysenylene, 1,4-triphenylylene, 2,7 triphenylylene, 1,4-pentacenylene, 5,14 pentacenylene, 6,13 pentacenylene, 1,6-coronenylene, 1,4-trinaphthylenylene, 2,9 trinaphthylenylene and 5,18 trinaphthylenylene, and at least 10 mol. % are arylene units (R1-b) of formula:

—Ar$_2$— wherein:
Ar$_2$ is substituted or not,
Ar$_2$ is selected from the group consisting of 1,2-phenylene (or o-phenylene), 1,2-naphthylene, 2,3-naphthylene, 1,7-naphthylene, 1,2-phenanthrylene, 1,8-phenanthrylene, 1,9-phenanthrylene, 2,3-phenanthrylene, 2,5-phenanthrylene, 2,10-phenanthrylene, 1,2-anthrylene, 1,7-anthrylene, 1,3-phenylene (or m phenylene), 1,3-naphtylene, 1,6-naphtylene, 1,3-phenanthrylene, 1,5-phenanthrylene, 1,7-phenanthrylene, 2,4-phenanthrylene, 2,9-phenanthrylene, 3,10-phenanthrylene, 1,3-anthrylene, 1,6-anthrylene, 1,8-naphthylene, 1,10-phenanthrylene, 3,5-phenanthrylene, 1,8-anthrylene, 1,9-anthrylene, 1,5-naphtylene, 2,6-naphtylene, 1,6-phenanthrylene, 3,9-phenanthrylene, 4,10 phenanthrylene, 1,5-anthrylene, 1,10-anthrylene and 2,6-anthrylene, and According to another embodiment, the polymer (P1) comprises at least 50 mol. % of recurring units (R1), bound to each other through C—C bonds, such that, based on the total number of moles of recurring units (R1):

less than 90 mol. % are arylene units (R1-a) of formula:

—Ar$_1$— wherein:
Ar$_1$ is substituted or not,
Ar$_1$ is selected from the group consisting of 1,4-phenylene (or p phenylene), 1,4-naphthylene, 1,4-phenanthrylene, 2,7 phenanthrylene, 1,4-anthrylene and 9,10 anthrylene, and at least 10 mol. % are arylene units (R1-b) of formula:

—Ar$_2$— wherein:
Ar$_2$ is substituted or not,
Ar$_2$ is selected from the group consisting of 1,2-phenylene (or o-phenylene), 1,2-naphthylene, 2,3-naphthylene, 1,7-naphthylene, 1,2-phenanthrylene, 1,8-phenanthrylene, 1,9-phenanthrylene, 2,3-phenanthrylene, 2,5-phenanthrylene, 2,10-phenanthrylene, 1,2-anthrylene, 1,7-anthrylene, 1,3-phenylene (or m phenylene), 1,3-naphtylene, 1,6-naphtylene, 1,3-phenanthrylene, 1,5-phenanthrylene, 1,7-phenanthrylene, 2,4-phenanthrylene, 2,9-phenanthrylene, 3,10-phenanthrylene, 1,3-anthrylene, 1,6-anthrylene, 1,8-naphthylene, 1,10-phenanthrylene, 3,5-phenanthrylene, 1,8-anthrylene, 1,9-anthrylene, 1,5-naphtylene, 2,6-naphtylene, 1,6-phenanthrylene, 3,9-phenanthrylene, 4,10 phenanthrylene, 1,5-anthrylene, 1,10-anthrylene and 2,6-anthrylene.

According to another embodiment yet, the polymer (P1) comprises at least 50 mol. % of recurring units (R1), bound to each other through C—C bonds, such that, based on the total number of moles of recurring units (R1):

less than 90 mol. % are arylene units (R1-a) of formula:

—Ar$_1$— wherein:
Ar$_1$ is substituted or not,
Ar$_1$ is selected from the group consisting of 1,4-phenylene (or p phenylene), 1,4-naphthylene, 1,4-phenanthrylene, 2,7 phenanthrylene, 1,4-anthrylene, 9,10 anthrylene, 2,7-pyrenylene, 1,4-naphthacenylene, 5,12 naphthacenylene, 1,4-chrysenylene, 1,4-triphenylylene, 2,7 triphenylylene, 1,4-pentacenylene, 5,14 pentacenylene, 6,13 pentacenylene, 1,6-coronenylene, 1,4-trinaphthylenylene, 2,9 trinaphthylenylene and 5,18 trinaphthylenylene, and at least 10 mol. % are arylene units (R1-b) of formula:

—Ar$_2$— wherein:
Ar$_2$ is substituted or not,
Ar$_2$ is selected from the group consisting of 1,2-phenylene (or o-phenylene), 1,2-naphthylene, 2,3-naphthylene, 1,7-naphthylene, 1,2-phenanthrylene, 1,8-phenanthrylene, 1,9-phenanthrylene, 2,3-phenanthrylene, 2,5-phenanthrylene, 2,10-phenanthrylene, 1,2-anthrylene, 1,7-anthrylene, 1,3-phenylene (or m phenylene), 1,3-naphtylene, 1,6-naphtylene, 1,3-phenanthrylene, 1,5-phenanthrylene, 1,7-phenanthrylene, 2,4-phenanthrylene, 2,9-phenanthrylene, 3,10-phenanthrylene, 1,3-anthrylene, 1,6-anthrylene, 1,8-naphthylene, 1,10-phenanthrylene, 3,5-phenanthrylene, 1,8-anthrylene, 1,9-anthrylene, 1,5-naphtylene, 2,6-naphtylene, 1,6-phenanthrylene, 3,9-phenanthrylene, 4,10 phenanthrylene, 1,5-anthrylene, 1,10-anthrylene and 2,6-anthrylene.

According to an embodiment, the polymer (P1) comprises at least 50 mol. % of recurring units (R1), bound to each other through C—C bonds, such that, based on the total number of moles of recurring units (R1):

less than 90 mol. % are arylene units (R1-a) of formula:

—Ar$_1$— wherein:
Ar$_1$ is substituted,
Ar$_1$ is 1,4-phenylene (or p phenylene), and at least 10 mol. % are arylene units (R1-b) of formula:

—Ar$_2$— wherein:
Ar$_2$ is not substituted,
Ar$_2$ is selected from the group consisting of 1,2-phenylene (or o-phenylene), 1,2-naphthylene, 2,3-naphthylene, 1,7-naphthylene, 1,2-phenanthrylene, 1,8-phenanthrylene, 1,9-phenanthrylene, 2,3-phenanthrylene, 2,5-phenanthrylene, 2,10-phenanthrylene, 1,2-anthrylene, 1,7-anthrylene, 1,3-phenylene (or m phenylene), 1,3-naphtylene, 1,6-naphtylene, 1,3-phenanthrylene, 1,5-phenanthrylene, 1,7-phenanthrylene, 2,4-phenanthrylene, 2,9-phenanthrylene, 3,10-phenanthrylene, 1,3-anthrylene, 1,6-anthrylene, 1,8-naphthylene, 1,10-phenanthrylene, 3,5-phenanthrylene, 1,8-anthrylene, 1,9-anthrylene, 1,5-naphtylene, 2,6-naphtylene, 1,6-phenanthrylene, 3,9-phenanthrylene, 4,10 phenanthrylene, 1,5-anthrylene, 1,10-anthrylene and 2,6-anthrylene.

According to an embodiment of the present invention, the polymer (P1) is a polyphenylene polymer, consisting essentially in recurring units (R1) such that, based on the total number of moles of recurring units (R1):
- less than 90 mol. % are substituted 1,4-phenylene (or p phenylene), and
- at least 10 mol. % are unsubstituted 1,2-phenylene (or o-phenylene) or unsubstituted 1,3-phenylene (or m phenylene).

Monovalent Substituting Group

According to an embodiment, the monovalent substituting group is a solubilizing group, that-is-to say a substituting group increasing the solubility of the polyarylene (P1) polymer in at least one organic solvent, for example selected from the group consisting of dimethylformamide, N-methylpyrrolidinone, hexamethylphosphoric triamide, benzene, tetrahydrofuran and dimethoxyethane. These solvents are commonly used for the manufacture of the polyarylene (P1) polymer by a solution polymerization process.

According to an embodiment, the monovalent substituting group is a group increasing the fusibility of the polyarylene (P1) polymer, that-is-to-say lowering the glass transition temperature (Tg) of the polymer (P1) and its melt viscosity.

The monovalent substituting group can be selected from the group consisting of:
- hydrocarbyls such as alkyls, aryls, alkylaryls and aralkyls;
- halogens such as —Cl, —Br, —F and —I;
- hydrocarbyl groups partially or completely substituted by at least one halogen atom such as halogenoalkyls, halogenoaryls, halogenoalkylaryls and halogenoaralkyls;
- hydroxyl;
- hydrocarbyl groups substituted by at least one hydroxyl group, such as hydroxyalkyls, hydroxyaryls, hydroxyalkylaryls and hydroxyaralkyls;
- hydrocarbyloxys [—O—R, where R is a hydrocarbyl group], such as alkoxys, aryloxys, alkylaryloxys and aralkyloxys;
- amino (—NH$_2$);
- hydrocarbyl groups substituted by at least one amino group, such as aminoalkyls and aminoaryls;
- hydrocarbylamines [—NHR or —NR$_2$, where R is a hydrocarbyl group] such as alkylamines and arylamines;
- carboxylic acids and their metal or ammonium salts, carboxylic acid halides, carboxylic anhydrides;
- hydrocarbyl groups substituted by at least one of carboxylic acids, metals or ammonium salts thereof, carboxylic acid halides and carboxylic anhydrides, such as —R—C(=O)OH where R is an alkyl or an aryl group;
- hydrocarbylesters [—C(=O)OR or —O—C(=O)R, where R is a hydrocarbyl group] such as alkylesters, arylesters, alkylarylesters and aralkylesters;
- amido [—C(=O)NH$_2$];
- hydrocarbyl groups substituted by at least one amido group;
- hydrocarbylamide monoesters [—C(=O)NHR or —NH—C(=O)—R, where R is a hydrocarbyl group], such as alkylamides, arylamides, alkylarylamides and aralkylamides, and hydrocarbylamide diesters [—C(=O)NR$_2$ or —N—C(=O)R$_2$, where R are a hydrocarbyl groups], such as dialkylamides and diarylamides;
- sulfinic acid (—SO$_2$H), sulfonic acid (—SO$_3$H), their metal or ammonium salts,
- hydrocarbylsulfones [—S(=O)$_2$—R, where R is the hydrocarbyl group], such as alkylsulfones, arylsulfones, alkylarylsulfones, aralkylsulfones;
- aldehyde [—C(=O)H] and haloformyls [—C(=O)X, wherein X is a halogen atom];
- hydrocarbylketones [—C(=O)—R, where R is a hydrocarbyl group], such as alkylketones, arylketones, alkylarylketones and aralkylketones;
- hydrocarbyloxyhydrocarbylketones [—C(=O)—R$_1$—O—R$_2$, where R$_1$ is a divalent hydrocarbon group such as an alkylene, an arylene, an alkylarylene or an aralkylene, preferably a C1-C18 alkylene, a phenylene, a phenylene group substituted by at least one alkyl group, or an alkylene group substituted by at least one phenyl group; and R$_2$ is a hydrocarbyl group, such as an alkyl, aryl, alkylaryl or aralkyl group], such as alkyloxyalkylketones, alkyloxyarylketones, alkyloxyalkylarylketones, alkyloxyaralkylketones, aryloxyalkylketones, aryloxyarylketones, aryloxyalkylarylketones and aryloxyaralkylketones;
- any of the above groups comprising at least one hydrocarbyl group or a divalent hydrocarbon group R$_1$, wherein said hydrocarbyl group or said R$_1$ is itself substituted by at least one of the above listed monovalent substituting groups, e.g. an arylketone —C(=O)—R, where R is an aryl group substituted by one hydroxyl group;

wherein
- the hydrocarbyl groups contain preferably from 1 and 30 carbon atoms, more preferably from 1 to 12 carbon atoms and still more preferably from 1 to 6 carbon atoms;
- the alkyl groups contain preferably from 1 to 18 carbon atoms, and more preferably from 1 to 6 carbon atoms; very preferably, they are chosen from methyl, ethyl, n-propyl, isopropyl, n-butyl, isobutyl and tert-butyl;
- the aryl groups are defined as monovalent groups consisting of one end and one core composed of one benzene ring (such the phenyl group) or of a plurality of benzene rings directly linked to each other via a carbon-carbon linkage (such as the biphenyl group) or fused together by sharing two or more neighboring ring carbon atoms (such as the naphthyl groups), and wherein the ring carbon atoms are possibly substituted by at least one nitrogen, oxygen or sulfur atom; preferably, in the aryl groups, no ring carbon atom is substituted;
- the aryl groups contain preferably from 6 to 30 carbon atoms; more preferably, they are phenyl groups;
- the alkyl group which is contained in the alkylaryl groups meets the preferences of the alkyl groups as above expressed;
- the aryl group which is contained in the aralkyl groups meets the preferences of the aryl groups as above expressed.

According to a preferred embodiment, the monovalent substituting group is chosen from the group consisting of:
- hydrocarbylketones [—C(=O)—R, where R is a hydrocarbyl group] and
- hydrocarbyloxyhydrocarbylketones [—C(=O)—R$_1$—O—R$_2$, where R$_1$ is a divalent hydrocarbon group and R$_2$ is a hydrocarbyl group], said hydrocarbylketones and hydrocarbyloxyhydrocarbylketones being unsubstituted or substituted by at least one of the above listed monovalent substituting groups.

According to another preferred embodiment, the monovalent substituting group is chosen from arylketones and aryloxyarylketones, said arylketones and aryloxyarylketones being unsubstituted or substituted by at least one of the above listed monovalent substituting groups.

According to another preferred embodiment, the monovalent substituting group is an (unsubstituted) arylketone, in particular it can be a phenylketone [—C(=O)-phenyl].

According to an embodiment of the present invention, the polymer (P1) comprises at least 50 mol. % of recurring units (R1) consisting of m-phenylenes and p-phenylenes, optionally substituted by at least one monovalent substituting group as described above, for example at least at least 55 mol. %, at least 60 mol. %, at least 65 mol. %, at least 70 mol. %, at least 75 mol. %, at least 80 mol. %, at least 85 mol. %, at least 90 mol. % or at least 95 mol. % of recurring units (R1) consisting of m-phenylenes and p-phenylenes, optionally substituted by at least one monovalent substituting group as described above.

According to another embodiment of the present invention, the polymer (P1) consists essentially in recurring units (R1) consisting of m-phenylenes and p-phenylenes, optionally substituted by at least one monovalent substituting group as described above.

According to another embodiment of the present invention, the polymer (P1) consists essentially in recurring units (R1) consisting of unsubstituted m-phenylenes and substituted p-phenylenes.

According to an embodiment, the recurring units (R1) of the polymer (P1) are such that at least 10 mol. % are kink-forming arylene units (R1-b), based on the total number of moles of recurring units (R1), for example at least 12 mol. %, at least 15 mol. %, at least 20 mol. %, at least 25 mol. %, at least 30 mol. %, at least 35 mol. %, at least 40 mol. % or at least 45 mol. %.

According to another embodiment, the recurring units (R1) of the polymer (P1) are such that less than 90 mol. % are kink-forming arylene units (R1-b), based on the total number of moles of recurring units (R1), for example less than 80 mol. %, less than 75 mol. %, less than 70 mol. % or less than 65 mol. %.

According to an embodiment of the present invention, the polymer (P1) comprises, in addition to recurring units (R1), recurring units (R1*) comprising a Ar—SO$_2$—Ar' group, wherein Ar and Ar' are aromatic groups, said recurring units (R1*) are according to formula (S1):

—Ar$^5$-(T'-Ar$^6$)$_n$—O—Ar$^7$—SO$_2$—[Ar$^8$-(T-Ar$^9$)$_n$—SO$_2$]$_m$—Ar$^{10}$—O— (S1)

wherein
Ar$^5$, Ar$^6$, Ar$^7$, Ar$^8$, and Ar$^9$, equal to or different from each other and at each occurrence, are independently a aromatic mono- or polynuclear group;
T and T' are independently a bond or a divalent group optionally comprising at least one heteroatom;
preferably T' is selected from the group consisting of a bond, —CH$_2$—, —C(O)—, —C(CH$_3$)$_2$—, —C(CF$_3$)$_2$—, —C(=CCl$_2$), —C(CH$_3$)(CH$_2$CH$_2$COOH)—, —SO$_2$—, and a group of formula:

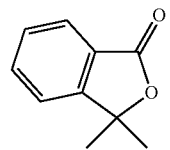

preferably T is selected from the group consisting of a bond, —CH$_2$—, —C(O)—, —C(CH$_3$)$_2$—, —C(CF$_3$)$_2$—, —C(=CCl$_2$)—, —C(CH$_3$)(CH$_2$CH$_2$COOH)—, and a group of formula:

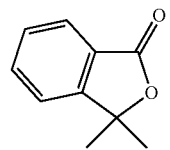

n and m are independently zero or an integer of 1 to 5;
Recurring units (R1*) can be notably selected from the group consisting of those of formulae (S1-A) to (S1-D) herein below:

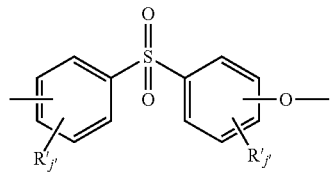
(S1-A)

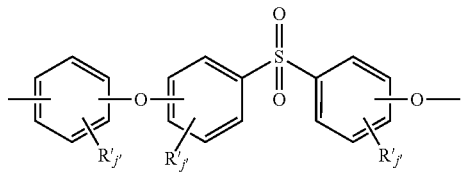
(S1-B)

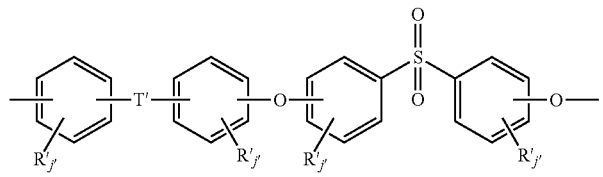
(S1-C)

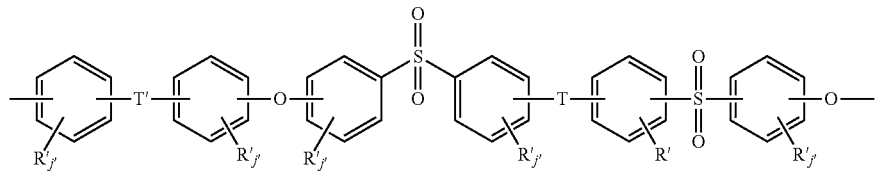
(S1-D)

wherein:
each of R', is independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

j' is zero or is an integer from 0 to 4;

T and T' are independently a bond or a divalent group optionally comprising one or more than one heteroatom; preferably T' is selected from the group consisting of a bond, —CH$_2$—, —C(O)—, —C(CH$_3$)$_2$—, —C(CF$_3$)$_2$—, —C(=CCl$_2$)—, —C(CH$_3$)(CH$_2$CH$_2$COOH)—, —SO$_2$—, and a group of formula:

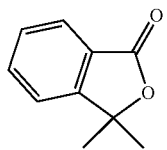

preferably T is selected from the group consisting of a bond, —CH$_2$—, —C(O)—, —C(CH$_3$)$_2$—, —C(CF$_3$)$_2$—, —C(=CCl$_2$)—, —C(CH$_3$)(CH$_2$CH$_2$COOH)—, and a group of formula:

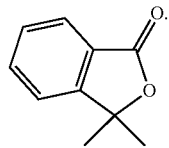

In recurring unit (R1*), the respective phenylene moieties may independently have 1,2-, 1,4- or 1,3-linkages to the other moieties different from R' in the recurring unit. Preferably, said phenylene moieties have 1,3- or 1,4-linkages, more preferably they have 1,4-linkage. Still, in recurring units ((R1*), j' is at each occurrence zero, that is to say that the phenylene moieties have no other substituents than those enabling linkage in the main chain of the polymer.

According to an embodiment of the present invention, the polymer (P1) comprises, in addition to recurring units (R1), recurring units (R2*) comprising a Ar—C(O)—Ar' group, wherein Ar and Ar' are aromatic groups, said recurring units (R2*) being selected from the group consisting of formulas (J-A) to (J-O):

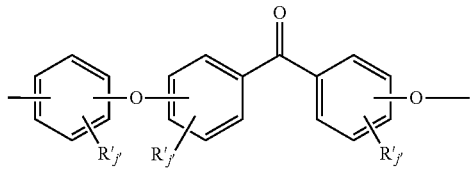
(J-A)

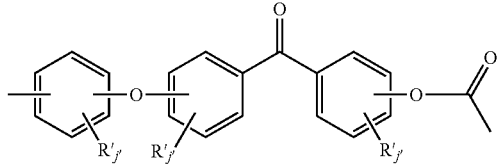
(J-B)

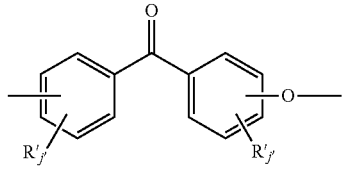
(J-C)

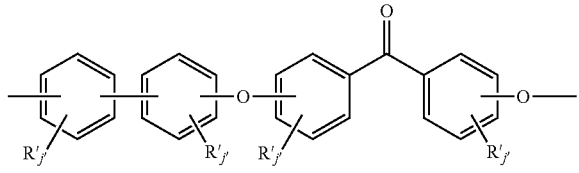
(J-D)

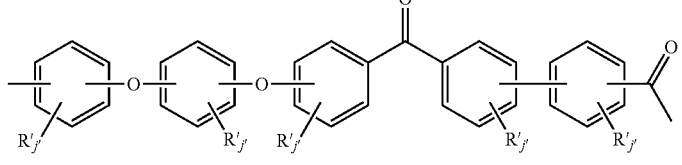
(J-E)

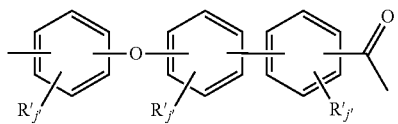
(J-F)
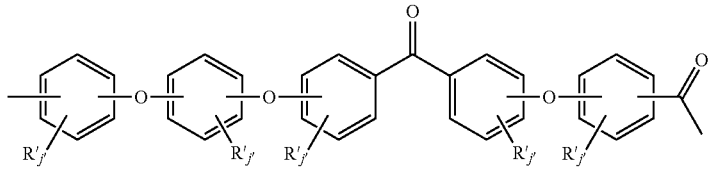
(J-G)
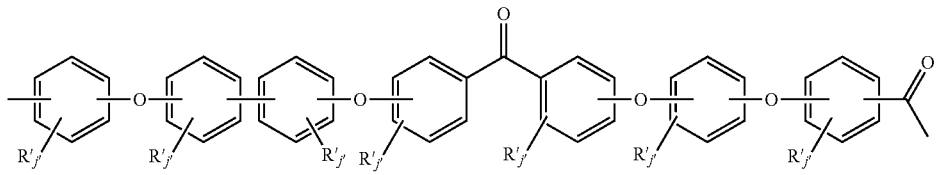
(J-H)
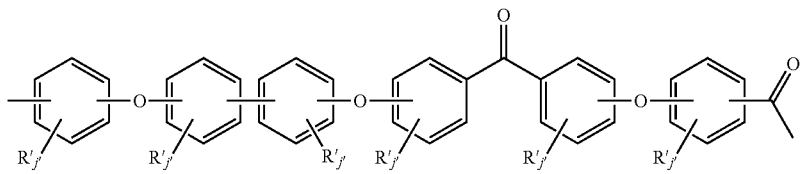
(J-I)
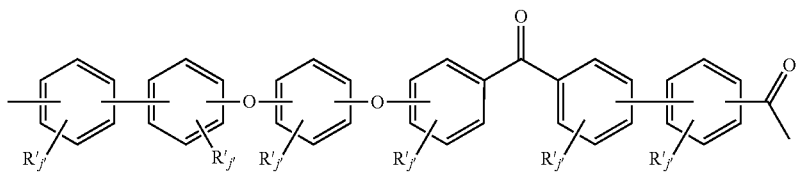
(J-J)
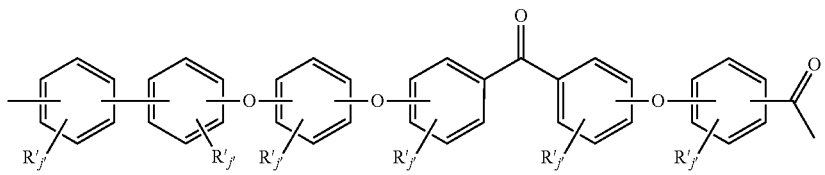
(J-K)
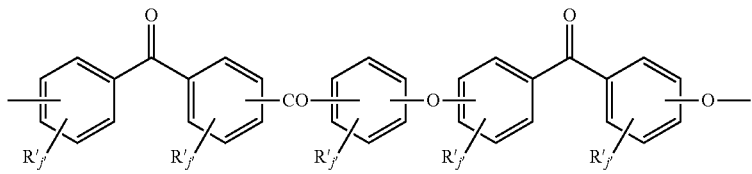
(J-L)
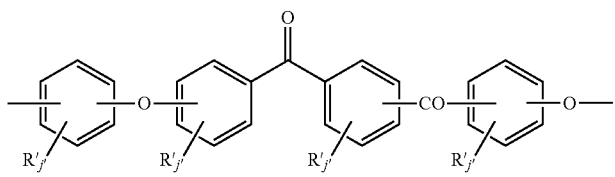
(J-M)
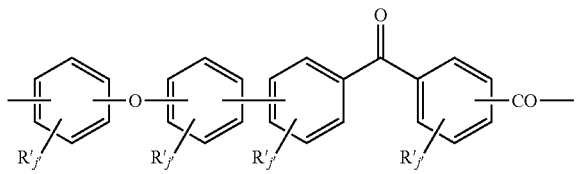
(J-N)

-continued

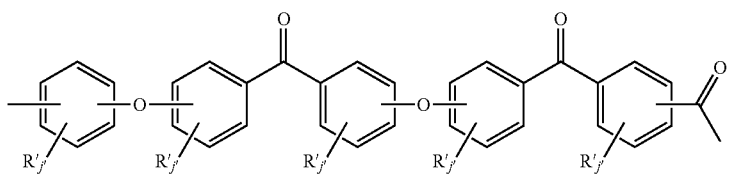
(J-O)

Wherein
each of R' is independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

j' is zero or is an integer from 0 to 4.

According to an embodiment of the present invention, the polymer (P1) comprises, in addition to recurring units (R1), recurring units (R2*) comprising a Ar—C(O)—Ar' group, wherein Ar and Ar' are aromatic groups, said recurring units (R3*) being generally selected from the group consisting of formulae (K-A) and (K-B), herein below:

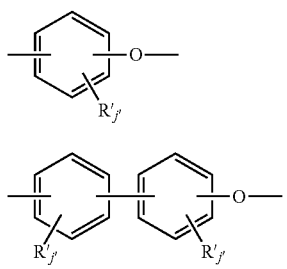

(K-A)

(K-B)

wherein:
each of R' is independently selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

j' is zero or is an integer from 0 to 4.

According to an embodiment, more than 70 mol. %, more than 80 mol. % or more than 85 mol. % of the recurring units of the polymer (P1) polymer are recurring units (R1), as above detailed, the complement to 100 mol. % being recurring units (R1*), as above detailed, and/or recurring units (R2*), as above detailed, and/or recurring units (R3*), as above detailed.

Still more preferably, essentially all the recurring units of the polymer (P1) are recurring units (R1), chain defects, or very minor amounts of other units might be present, being understood that these latter do not substantially modify the properties of the polymer (P1).

Polymer (P2)

According to an embodiment, the polymer (P2) is selected from the group consisting of poly(aryl ether sulfone) (PAES) and poly(ether imide) (PEI).

When the polymer (P2) is a poly(aryl ether sulfone) (PAES), it is preferably a polyphenylsulfone (PPSU), a polyethersulfone (PES) or a polysulfone (PSU).

Poly(Aryl Ether Sulfone) (PAES)

For the purpose of the present invention, a "poly(aryl ether sulfone) (PAES)" denotes any polymer comprising at least 50 mol. % of recurring units ($R_{PAES}$) of formula (K), based on the total number of moles in the polymer:

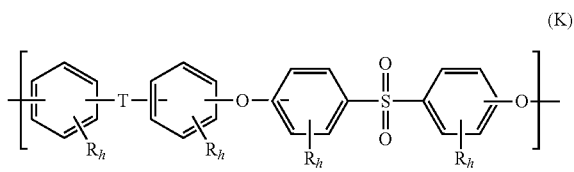

(K)

where
R, at each location, is independently selected from a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium;

h, for each R, is independently zero or an integer ranging from 1 to 4; and

T is selected from the group consisting of a bond and a group —C(Rj)(Rk)-, where Rj and Rk, equal to or different from each other, are selected from a hydrogen, a halogen, an alkyl, an alkenyl, an alkynyl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium.

According to an embodiment, Rj and Rk are methyl groups.

According to an embodiment, h is zero for each R. In other words, according to this embodiment, the recurring units ($R_{PAES}$) are units of formula (K'):

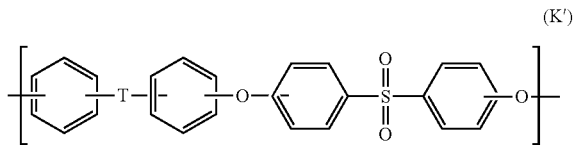

(K')

According to an embodiment of the present invention, at least 60 mol. %, at least 70 mol. %, at least 80 mol. %, at least 90 mol. %, at least 95 mol. %, at least 99 mol. % or all of the recurring units in the PAES are recurring units ($R_{PAES}$) of formula (K) or formula (K').

According to an embodiment, the PAES has a Tg ranging from 160 and 250° C., preferably from 170 and 240° C., more preferably from 180 and 230° C., as measured by differential scanning calorimetry (DSC) according to ASTM D3418.

Poly(Biphenyl Ether Sulfone) (Co)Polymer (PPSU)

According to an embodiment, polymer (P2) is a poly(aryl ether sulfone) (PAES), more precisely a poly(biphenyl ether sulfone) (PPSU).

A poly(biphenyl ether sulfone) polymer is a polyarylene ether sulfone which comprises a biphenyl moiety. Poly(biphenyl ether sulfone) is also known as polyphenyl sulfone (PPSU) and for example results from the condensation of 4,4'-dihydroxybiphenyl (biphenol) and 4,4'-dichlorodiphenyl sulfone.

For the purpose of the present invention, a poly(biphenyl ether sulfone) (co)polymer (PPSU) denotes any polymer comprising at least 50 mol. % of recurring units (Rppsu) of formula (L), the mol. % being based on the total number of moles in the polymer:

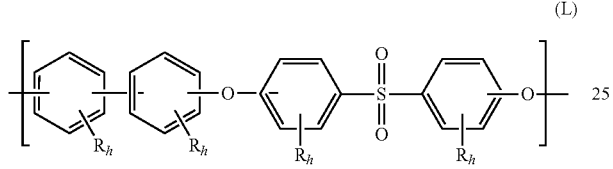
(L)

where
R, at each location, is independently selected from a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; and h, for each R, is independently zero or an integer ranging from 1 to 4 (for example 1, 2, 3 or 4).

According to an embodiment, R is, at each location in formula (L) above, independently selected from the group consisting of a C1-C12 moeity optionally comprising one or more than one heteroatoms; sulfonic acid and sulfonate groups; phosphonic acid and phosphonate groups; amine and quaternary ammonium groups.

According to an embodiment, h is zero for each R. In other words, according to this embodiment, the recurring units (Rppsu) are units of formula (L'):

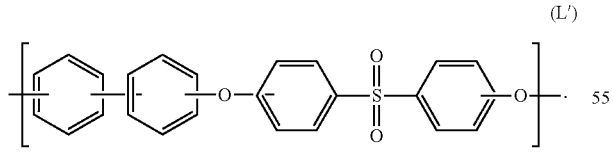
(L')

According to an embodiment of the present invention, at least 60 mol. %, at least 70 mol. %, at least 80 mol. %, at least 90 mol. %, at least 95 mol. %, at least 99 mol. % or all of the recurring units in the PPSU are recurring units ($R_{PPSU}$) of formula (L) and/or formula (L').

According to another embodiment of the present invention, a poly(biphenyl ether sulfone) (PPSU) denotes any polymer comprising at least 50 mol. % of recurring units (Rppsu) of formula (L''):

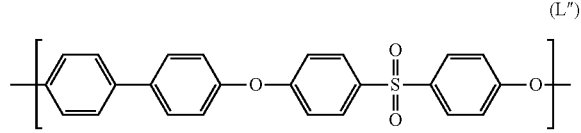
(L'')

(the mol. % being based on the total number of moles in the polymer).

The PPSU polymer of the present invention can therefore be a homopolymer or a copolymer. If it is a copolymer, it can be a random, alternate or block copolymer.

According to an embodiment of the present invention, at least 60 mol. %, at least 70 mol. %, at least 80 mol. %, at least 90 mol. %, at least 95 mol. %, at least 99 mol. % or all of the recurring units in the PPSU are recurring units ($R_{PPSU}$) of formula (L'').

When the poly(biphenyl ether sulfone) (PPSU) is a copolymer, it can be made of recurring units ($R^*_{PPSU}$), different from recurring units ($R_{PPSU}$), such as recurring units of formulas (M), (N) and/or (O):

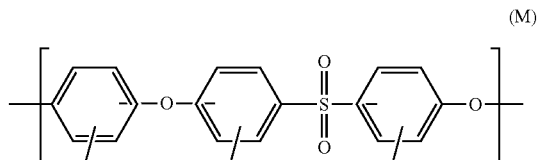
(M)

(N)

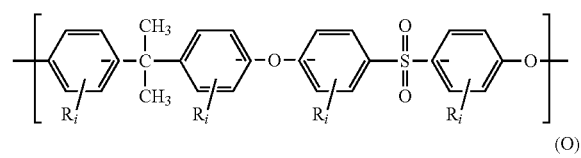
(O)

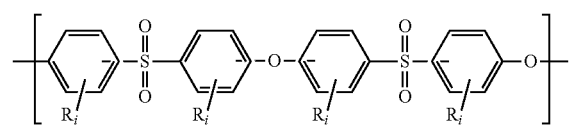

where
R, at each location, is independently selected from a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; and i, for each R, is independently zero or an integer ranging from 1 to 4 (for example 1, 2, 3 or 4).

According to an embodiment, R is, at each location in formulas (M) to (O) above, independently selected from the group consisting of a C1-C12 moeity optionally comprising one or more than one heteroatoms; sulfonic acid and sulfonate groups; phosphonic acid and phosphonate groups; amine and quaternary ammonium groups.

According to an embodiment, i is zero for each R of formulas (M), (N) or (O). In other words, according to this embodiment, the recurring units ($R^*_{PPSU}$) are units of formulas (M'), (N') and/or (O'):

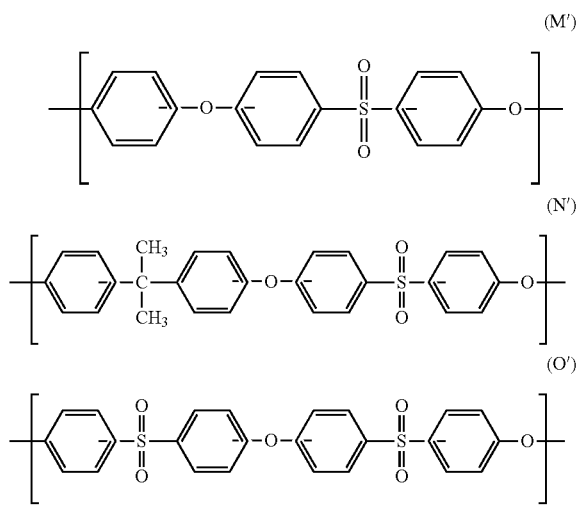

According to an embodiment of the present invention, less than 40 mol. %, less than 30 mol. %, less than 20 mol. %, less than 10 mol. %, less than 5 mol. %, less than 1 mol. % or all of the recurring units in the PPSU are recurring units (R*$_{PPSU}$) of formulas (M), (N), (O), (M'), (N') and/or (O').

According to another embodiment of the present invention, a poly(biphenyl ether sulfone) (PPSU) is a copolymer and has recurring units (R*$_{PPSU}$), different from recurring units (R$_{PPSU}$), such as recurring units of formulas (M"), (N") and/or (O"):

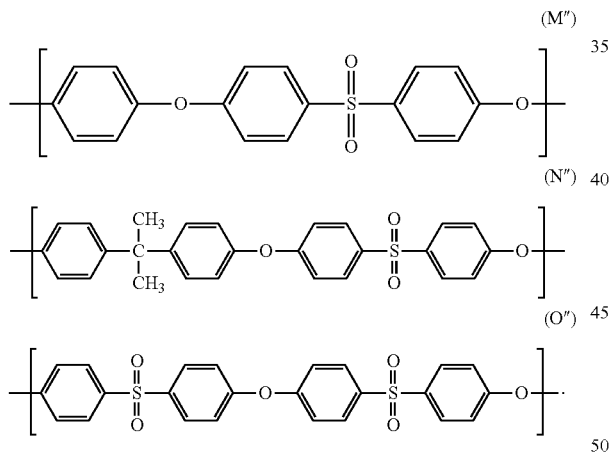

According to an embodiment of the present invention, less than 45 mol. %, less than 40 mol. %, less than 35 mol. %, less than 30 mol. %, less than 20 mol. %, less than 10 mol. %, less than 5 mol. %, less than 1 mol. % or all of the recurring units in the PPSU are recurring units (R*$_{PPSU}$) of formulas (M"), (N") and/or (O").

According to the present invention, the polymeric component of the part material comprises from 5 to 95 wt. % of a poly(aryl ether sulfone) (PAES), for example from 5 to 95 wt. % of a poly(biphenyl ether sulfone) (PPSU), based on the total weight of the polymeric component in the part material.

According to one embodiment, the polymeric component of the part material comprises from 15 to 83 wt. % or from 20 to 80 wt. %, of poly(biphenyl ether sulfone) (PPSU), based on the total weight of the polymeric component in the part material.

According to the present invention, the weight average molecular weight Mw of the PPSU may be from 30,000 to 80,000 g/mol, for example from 35,000 to 75,000 g/mol or from 40,000 to 70,000 g/mol.

According to the present invention, the melt flow rate or melt flow index (at 365° C. under a weight of 5 kg according to ASTM D1238) (MFR or MFI) of the PPSU may be from 1 to 60 g/10 min, for example from 5 to 50 g/10 min or from 10 to 40 g/10 min.

The poly(biphenyl ether sulfone) (PPSU) can also be a blend of a PPSU homopolymer and at least one PPSU copolymer as described above.

The poly(biphenyl ether sulfone) (PPSU) can be prepared by any method known in the art. It can for example result from the condensation of 4,4'-dihydroxybiphenyl (biphenol) and 4,4'-dichlorodiphenyl sulfone. The reaction of monomer units takes place through nucleophilic aromatic substitution with the elimination of one unit of hydrogen halide as leaving group. It is to be noted however that the structure of the resulting poly(biphenyl ether sulfone) does not depend on the nature of the leaving group.

Defects, end groups and monomers' impurities may be incorporated in minor amounts in the (co)polymer (PPSU) of the present invention, if it does not affect negatively the performances of the same.

PPSU is commercially available as Radel® PPSU from Solvay Specialty Polymers USA, L.L.C.

Polysulfone (Co)Polymer (PSU)

According to an embodiment, polymer (P2) is a poly(aryl ether sulfone) (PAES), more precisely a polysulfone (PSU) polymer.

For the purpose of the present invention, a polysulfone (PSU) denotes any polymer comprising at least 50 mol. % recurring units (Rpsu) of formula (N), the mol. % being based on the total number of moles in the polymer:

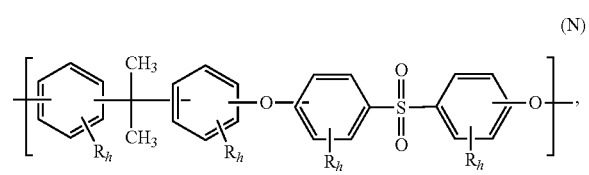

where

R, at each location, is independently selected from a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium;

h, for each R, is independently zero or an integer ranging from 1 to 4.

According to an embodiment, R is, at each location in formula (N) above, independently selected from the group consisting of a C1-C12 moiety optionally comprising one or more than one heteroatoms; sulfonic acid and sulfonate groups; phosphonic acid and phosphonate groups; amine and quaternary ammonium groups.

According to an embodiment, h is zero for each R. In other words, according to this embodiment, the recurring units (R$_{PSU}$) are units of formula (N'):

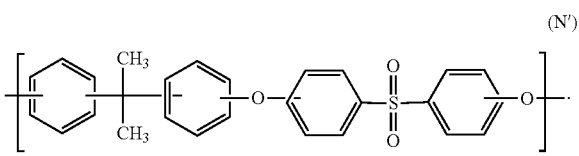

According to an embodiment of the present invention, at least 60 mol. % (based on the total number of moles in the polymer), at least 70 mol. %, at least 80 mol. %, at least 90 mol. %, at least 95 mol. %, at least 99 mol. % or all of the recurring units in the PSU are recurring units ($R_{PSU}$) of formula (N) and/or (N').

According to another embodiment, a polysulfone (PSU) denotes any polymer of which more at least 50 mol. % of the recurring units are recurring units (Rpsu) of formula (N"):

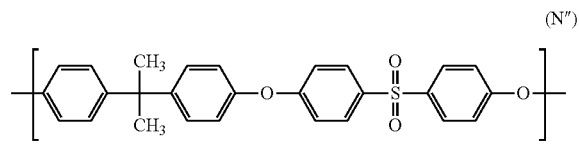

the mol. % being based on the total number of moles in the polymer.

According to an embodiment of the present invention, at least 60 mol. %, at least 70 mol. %, at least 80 mol. %, at least 90 mol. %, at least 95 mol. %, at least 99 mol. % or all of the recurring units in the PSU are recurring units ($R_{PSU}$) of formula (N").

The PSU polymer of the present invention can therefore be a homopolymer or a copolymer. If it is a copolymer, it can be a random, alternate or block copolymer.

When the polysulfone (PSU) is a copolymer, it can be made of recurring units ($R^*_{PSU}$), different from recurring units (Rpsu), such as recurring units of formula (L), (M) and/or (O) above described.

The polysulfone (PSU) can also be a blend of a PSU homopolymer and at least one PSU copolymer, as described above.

PSU is available as Udel® PSU from Solvay Specialty Polymers USA,
L.L.C.

Poly(Ether Sulfone) (Co)Polymer (PES)

According to an embodiment, polymer (P2) in the polymeric component of the part material is a poly(aryl ether sulfone) (PAES), more precisely a poly(ether sulfone) (PES) (co)polymer.

For the purpose of the present invention, a poly(ether sulfone) (PES) denotes any polymer comprising at least 50 mol. % recurring units (RpEs) of formula (O), the mol. % being based on the total number of moles of recurring units in the polymer:

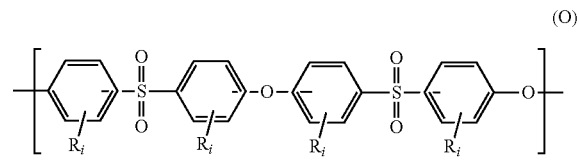

where
R, at each location, is independently selected from a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; and i, for each R, is independently zero or an integer ranging from 1 to 4 (for example 1, 2, 3 or 4).

According to an embodiment, i is zero for each R of formula (O). In other words, according to this embodiment, the recurring units ($R_{PES}$) are units of formula (O'):

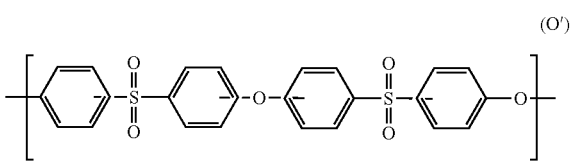

According to another embodiment of the present invention, a poly(ether sulfone) (PES) has recurring units ($R_{PES}$) of formula (O"):

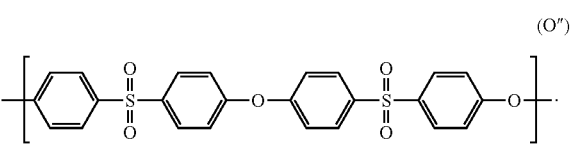

According to an embodiment of the present disclosure, at least 60 mol. % (based on the total number of moles of recurring units in the polymer), at least 70 mol. %, at least 80 mol. %, at least 90 mol. %, at least 95 mol. %, at least 99 mol. % or all of the recurring units in the PES are recurring units ($R_{PES}$) of formulas (O), (O') or (O").

PES can be prepared by known methods and is notably available as Veradel® PESU from Solvay Specialty Polymers USA, L.L.C.

Poly(Ether Imide) (PEI)

According to an embodiment, polymer (P2) in the polymeric component of the part material is a poly(ether imide) (PEI).

As used herein, a poly(ether imide) (PEI) denotes any polymer comprising at least 50 mol. %, based on the total number of moles in the polymer, of recurring units ($R_{PEI}$) comprising at least one aromatic ring, at least one imide group, as such and/or in its amic acid form, and at least one ether group. Recurring units ($R_{PEI}$) may optionally further comprise at least one amide group which is not included in the amic acid form of an imide group.

According to an embodiment, the recurring units ($R_{PEI}$) are selected from the group consisting of following formulas (I), (II), (III), (IV), (V) and mixtures thereof:

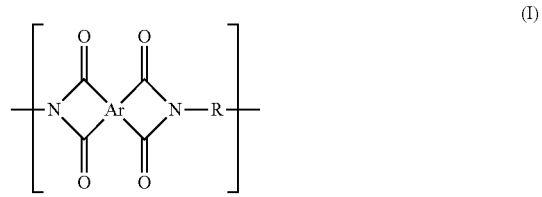

-continued

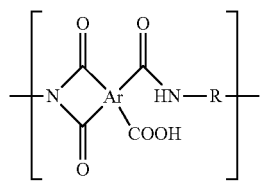
(II)

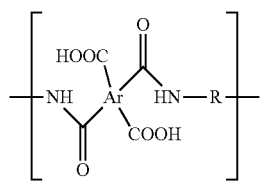
(III)

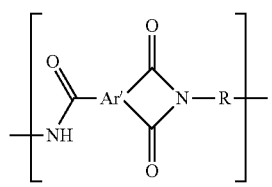
(IV)

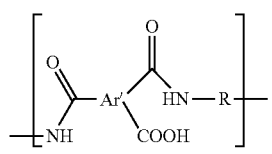
(V)

where

Ar is a tetravalent aromatic moiety and is selected from the group consisting of a substituted or unsubstituted, saturated, unsaturated or aromatic monocyclic and polycyclic group having 5 to 50 carbon atoms;

Ar' is a trivalent aromatic moiety and is selected from the group consisting of a substituted, unsubstituted, saturated, unsaturated, aromatic monocyclic and aromatic polycyclic group having from 5 to 50 C atoms; and R is selected from the group consisting of substituted and unsubstituted divalent organic radicals, for example selected from the group consisting of (a) aromatic hydrocarbon radicals having 6 to 20 carbon atoms and halogenated derivatives thereof;

(b) straight or branched chain alkylene radicals having 2 to 20 carbon atoms;

(c) cycloalkylene radicals having 3 to 20 carbon atoms, and (d) divalent radicals of formula (VI):

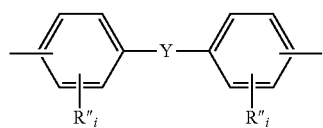
(VI)

where

Y is selected from the group consisting of alkylenes of 1 to 6 carbon atoms, for example —C(CH$_3$)$_2$ and —C$_n$H$_{2n}$— (n being an integer from 1 to 6); perfluoroalkylenes of 1 to 6 carbon atoms, for example —C(CF$_3$)$_2$ and —C$_n$F$_{2n}$—

(n being an integer from 1 to 6); cycloalkylenes of 4 to 8 carbon atoms; alkylidenes of 1 to 6 carbon atoms; cycloalkylidenes of 4 to 8 carbon atoms; —O—; —S—; —C(O)—; —SO$_2$—; —SO—, and R" is selected from the group consisting of hydrogen, halogen, alkyl, alkenyl, alkynyl, aryl, ether, thioether, carboxylic acid, ester, amide, imide, alkali earth metal sulfonate, alkaline earth metal sulfonate, alkyl sulfonate, alkali earth metal phosphonate, alkaline earth metal phosphonate, alkyl phosphonate, amine and quaternary ammonium and i, for each R", is independently zero or an integer ranging from 1 to 4, with the proviso that at least one of Ar, Ar' and R comprise at least one ether group and that the ether group is present in the polymer chain backbone.

According to an embodiment, Ar is selected from the group consisting of formulas:

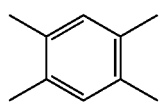
(VII)

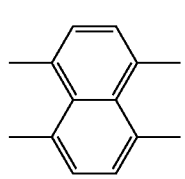
(VIII)

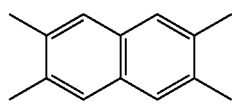
(IX)

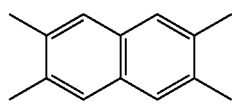
(X)

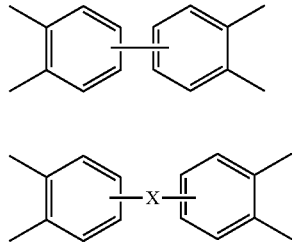
(XI)

where

X is a divalent moiety, having divalent bonds in the 3,3', 3,4', 4,3" or the 4,4' positions and is selected from the group consisting of alkylenes of 1 to 6 carbon atoms, for example —C(CH$_3$)$_2$ and —C$_n$H$_{2n}$— (n being an integer from 1 to 6); perfluoroalkylenes of 1 to 6 carbon atoms, for example —C(CF$_3$)$_2$ and —C$_n$F$_{2n}$— (n being an integer from 1 to 6); cycloalkylenes of 4 to 8 carbon atoms; alkylidenes of 1 to 6 carbon atoms; cycloalkylidenes of 4 to 8 carbon atoms; —O—; —S—; —C(O)—; —SO$_2$—; —SO—;

or X is a group of the formula —O—Ar"—O—, wherein Ar" is a aromatic moiety selected from the group consisting of a substituted or unsubstituted, saturated, unsaturated or aromatic monocyclic and polycyclic group having 5 to 50 carbon atoms.

According to an embodiment, Ar' is selected from the group consisting of formulas:

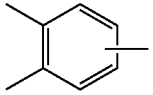  (XII)

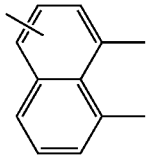  (XIII)

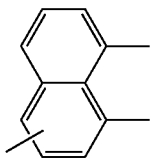  (XIV)

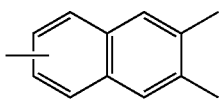  (XV)

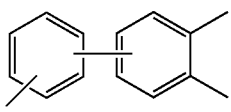  (XVI)

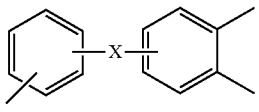  (XVII)

where

X is a divalent moiety, having divalent bonds in the 3,3', 3,4', 4,3" or the 4,4' positions and is selected from the group consisting of alkylenes of 1 to 6 carbon atoms, for example —C(CH$_3$)$_2$ and —C$_n$H$_{2n}$— (n being an integer from 1 to 6); perfluoroalkylenes of 1 to 6 carbon atoms, for example —C(CF$_3$)$_2$ and —C$_n$F$_{2n}$— (n being an integer from 1 to 6); cycloalkylenes of 4 to 8 carbon atoms; alkylidenes of 1 to 6 carbon atoms; cycloalkylidenes of 4 to 8 carbon atoms; —O—; —S—; —C(O)—; —SO$_2$—; —SO—;

or X is a group of the formula —O—Ar"—O—, wherein Ar" is a aromatic moiety selected from the group consisting of a substituted or unsubstituted, saturated, unsaturated or aromatic monocyclic and polycyclic group having 5 to 50 carbon atoms.

According to an embodiment of the present disclosure, at least 50 mol. %, at least 60 mol. %, at least 70 mol. %, at least 80 mol. %, at least 90 mol. %, at least 95 mol. %, at least 99 mol. % or all of the recurring units in the PEI are recurring units (R$_{PEI}$) of formulas (I), (II), (III), (IV), (V) and/or mixtures thereof, as defined above.

According to an embodiment, a poly(ether imide) (PEI) denotes any polymer comprising at least 50 mol. %, based on the total number of moles in the polymer, of recurring units (R$_{PEI}$) of formula (VII):

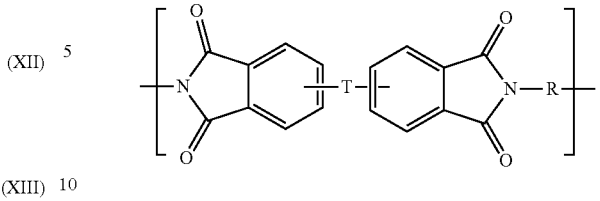  (XVIII)

where

R is selected from the group consisting of substituted and unsubstituted divalent organic radicals, for example selected from the group consisting of:

(a) aromatic hydrocarbon radicals having 6 to 20 carbon atoms and halogenated derivatives thereof;

(b) straight or branched chain alkylene radicals having 2 to 20 carbon atoms;

(c) cycloalkylene radicals having 3 to 20 carbon atoms, and (d) divalent radicals of formula (VI):

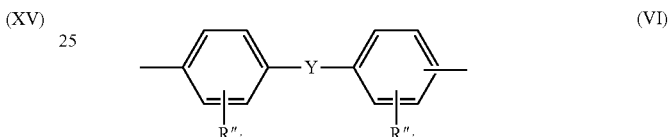  (VI)

where

Y is selected from the group consisting of alkylenes of 1 to 6 carbon atoms, for example —C(CH$_3$)$_2$ and —C$_n$H$_{2n}$— (n being an integer from 1 to 6); perfluoroalkylenes of 1 to 6 carbon atoms, for example —C(CF$_3$)$_2$ and —C$_n$F$_{2n}$— (n being an integer from 1 to 6); cycloalkylenes of 4 to 8 carbon atoms; alkylidenes of 1 to 6 carbon atoms; cycloalkylidenes of 4 to 8 carbon atoms; —O—; —S—; —C(O)—; —SO$_2$—; —SO—, and R" is selected from the group consisting of hydrogen, halogen, alkyl, alkenyl, alkynyl, aryl, ether, thioether, carboxylic acid, ester, amide, imide, alkali earth metal sulfonate, alkaline earth metal sulfonate, alkyl sulfonate, alkali earth metal phosphonate, alkaline earth metal phosphonate, alkyl phosphonate, amine and quaternary ammonium and i, for each R", is independently zero or an integer ranging from 1 to 4, with the proviso that at least one of Ar, Ar' and R comprise at least one ether group and that the ether group is present in the polymer chain backbone.

T can either be

—O— or —O—Ar"—O— wherein the divalent bonds of the —O— or the —O—Ar"—O— group are in the 3,3', 3,4', 4,3', or the 4,4' positions, wherein Ar" is a aromatic moiety selected from the group consisting of a substituted or unsubstituted, saturated, unsaturated or aromatic monocyclic and polycyclic group having 5 to 50 carbon atoms, for example a substituted or unsubtitutated phenylene, a substitued or unsubstituted biphenyl group, a susbtituted ou unsubstituted naphtalene group or a moiety comprising two substituted or unsubtitutated phenylene.

According to an embodiment of the present disclosure, Ar" is of the general formula (VI), as detailed above; for example, Ar" is of formula (XIX):

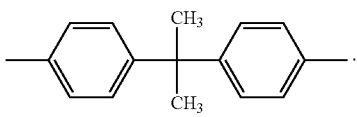
(XIX)

The polyetherimides (PEI) of the present invention may be prepared by any of the methods well-known to those skilled in the art including the reaction of a diamino compound of the formula $H_2N-R-NH_2$ (XX), where R is as defined before, with any aromatic bis(ether anhydride)s of the formula (XXI):

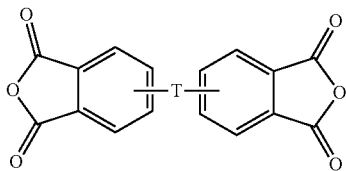
(XXI)

where T as defined before.

In general, the preparation can be carried out in solvents, e.g., o-dichlorobenzene, m-cresol/toluene, N,N-dimethylacetamide, at temperatures ranging from 20° C. to 250° C.

Alternatively, these polyetherimides can be prepared by melt polymerization of any dianhydrides of formula (XXI) with any diamino compound of formula (XX) while heating the mixture of the ingredients at elevated temperatures with concurrent intermixing.

The aromatic bis(ether anhydride)s of formula (XXI) include, for example:

2,2-bis[4-(2,3-dicarboxyphenoxy)phenyl]propane dianhydride;

4,4'-bis(2,3-dicarboxyphenoxy)diphenyl ether dianhydride;

1,3-bis(2,3-dicarboxyphenoxy)benzene dianhydride;

4,4'-bis(2,3-dicarboxyphenoxy)diphenyl sulfide dianhydride;

1,4-bis(2,3-dicarboxyphenoxy)benzene dianhydride;

4,4'-bis(2,3-dicarboxyphenoxy)benzophenone dianhydride;

4,4'-bis(2,3-dicarboxyphenoxy)diphenyl sulfone dianhydride;

2,2-bis[4 (3,4-dicarboxyphenoxy)phenyl]propane dianhydride;

4,4'-bis(3,4-dicarboxyphenoxy)diphenyl ether dianhydride;

4,4'-bis(3,4-dicarboxyphenoxy)diphenyl sulfide dianhydride;

1,3-bis(3,4-dicarboxyphenoxy)benzene dianhydride;

1,4-bis(3,4-dicarboxyphenoxy)benzene dianhydride;

4,4'-bis(3,4-dicarboxyphenoxy)benzophenone dianhydride;

4-(2,3-dicarboxyphenoxy)-4'-(3,4-dicarboxyphenoxy)diphenyl-2,2-propane dianhydride; and mixtures of such dianhydrides.

The organic diamines of formula (XX) are chosen from the group consisting of m-phenylenediamine, p-phenylenediamine, 2,2-bis(p-aminophenyl)propane, 4,4'-diaminodiphenyl-methane, 4,4'-diaminodiphenyl sulfide, 4,4'-diamino diphenyl sulfone, 4,4'-diaminodiphenyl ether, 1,5-diaminonaphthalene, 3,3'-dimethylbenzidine, 3,3'-dimethoxybenzidine, and mixtures thereof; preferably, the organic diamines of formula (XX) are chosen from the group consisting of m-phenylenediamine and p-phenylenediamine and mixture thereof.

According to an embodiment, a poly(ether imide) (PEI) denotes any polymer comprising at least 50 mol. %, based on the total number of moles in the polymer, of recurring units ($R_{PEI}$) of formulas (XXIII) or (XXIV), in imide forms, or their corresponding amic acid forms and mixtures thereof:

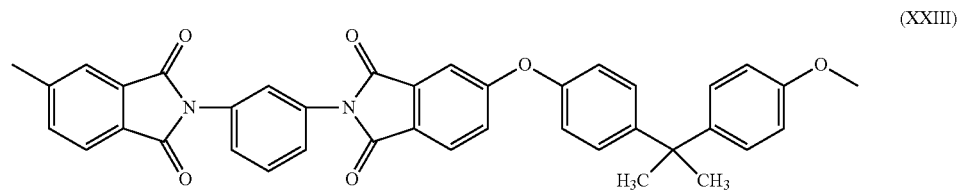
(XXIII)

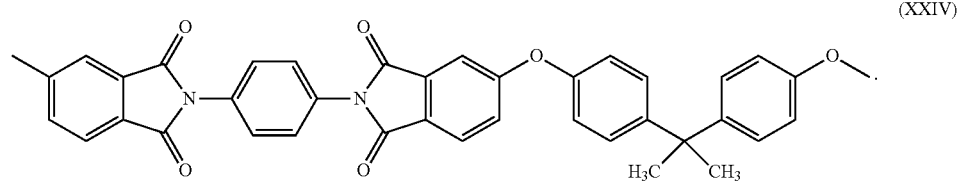
(XXIV)

In a preferred embodiment of the present invention, at least 50 mol. %, at least 60 mol. %, at least 70 mol. %, at least 80 mol. %, at least 90 mol. %, at least 95 mol. %, at least 99 mol. % or all of the recurring units in the PEI are recurring units ($R_{PEI}$) of formulas (XXIII) or (XXIV), in imide forms, or their corresponding amic acid forms and mixtures thereof.

Such aromatic polyimides are notably commercially available from Sabic Innovative Plastics as ULTEM® polyetherimides.

The part material can comprise only one PEI as polymer (P2). Alternatively, it can comprise several PEI, for example two, three, or even more than three PEI, as polymers (P2).

In a specific embodiment, the PEI polymer has a weight average molecular weight (Mw) of 10,000 to 150,000 g/mol, as measured by gel permeation chromatography, using a polystyrene standard.

In a specific embodiment, the PEI polymer has an intrinsic viscosity greater than 0.2 deciliters per gram (dl/g), beneficially 0.35 to 0.7 dl/g measured in m-cresol at 25° C.

According to the present invention, the melt flow rate or melt flow index (at 337° C. under a weight of 6.6 kg according to ASTM D1238) (MFR or MFI) of the PEI may be from 0.1 to 40 g/10 min, for example from 2 to 30 g/10 min or from 3 to 25 g/10 min.

In a specific embodiment, the PEI polymer has a Tg ranging from 160 and 270° C., as measured by differential scanning calorimetry (DSC) according to ASTM D3418, for example ranging from 170 and 260° C., from 180 and 250° C.

The applicant has found that such part material advantageously presents, when used to manufacture 3D objects, a good mechanical property profile (i.e. tensile strength and modulus of elasticity) in comparison to neat resins. In particular, the applicant has demonstrated that it is not possible to print articles of good quality with a neat polymer (P1) and that articles made of neat polymer (P2) do not have the required set of mechanical properties to make them well-suited for certain applications.

Part Material

The part material of the present invention can be made by methods well known to the person of ordinary skill in the art. For example, such methods include, but are not limited to, melt-mixing processes. Melt-mixing processes are typically carried out by heating the polymer components above the melting temperature of the thermoplastic polymers thereby forming a melt of the thermoplastic polymers. In some embodiments, the processing temperature ranges from about 280-450° C., preferably from about 290-440° C., from about 300-430° C. or from about 310-420° C. Suitable melt-mixing apparatus are, for example, kneaders, Banbury mixers, single-screw extruders, and twin-screw extruders. Preferably, use is made of an extruder fitted with means for dosing all the desired components to the extruder, either to the extruder's throat or to the melt. In the process for the preparation of the part material, the components of the part material, i.e. polymer (P1), polymer (P2) and optionally additives, are fed to the melt-mixing apparatus and melt-mixed in that apparatus. The components may be fed simultaneously as a powder mixture or granule mixer, also known as dry-blend, or may be fed separately.

The order of combining the components during melt-mixing is not particularly limited. In one embodiment, the component can be mixed in a single batch, such that the desired amounts of each component are added together and subsequently mixed. In other embodiments, a first sub-set of components can be initially mixed together and one or more of the remaining components can be added to the mixture for further mixing. For clarity, the total desired amount of each component does not have to be mixed as a single quantity. For example, for one or more of the components, a partial quantity can be initially added and mixed and, subsequently, some or all of the remainder can be added and mixed.

The part material may for example be used in the form of pellets in Pellet Additive Manufacturing (PAM) 3D printing processes.

Filament Material

The present invention also relates to a filament material comprising a polymeric component comprising at least one polymer (P1) and at least one polymer (P2), as above-described.

According to an embodiment, the polymeric component of the filament material comprises:
from 5 to 50 wt. % of at least polymer (P1), and
from 50 to 95 wt. % of at least polymer (P2).

According to an embodiment, the polymeric component of the filament material also comprises up to 60 wt. %, based on the total weight of the part material, of at least one additive selected from the group consisting of fillers, colorants, lubricants, plasticizers, flame retardants, nucleating agents, flow enhancers and stabilizers.

According to an embodiment, the polymeric component of the filament material is such that P2 is selected from the group consisting of poly(aryl ether sulfone) (PAES) and poly(ether imide) (PEI), more preferably P2 is a poly (biphenyl ether sulfone) (co)polymer (PPSU), even more preferably P2 is a poly(biphenyl ether sulfone) (co)polymer (PPSU) of Mw ranging from 47,000 to 57,000 g/mol.

This filament material is well-suited for use in a method for manufacturing a three-dimensional object.

All of the embodiments described above with respect to the part material do apply equally to the filament material.

As an example, the filament material of the invention may include other components. For example the filament material may comprise at least one additive, notably at least one additive selected from the group consisting of fillers, colorants, lubricants, plasticizers, stabilizers, flame retardants, nucleating agents, flow enhancers and combinations thereof.

The filament may have a cylindrical or substantially cylindrical geometry, or may have a non-cylindrical geometry, such as a ribbon filament geometry; further, filament may have a hollow geometry, or may have a core-shell geometry, with the support material of the present invention being used to form either the core or the shell.

When the filament has a cylindrical geometry, its diameter may vary between 0.5 mm and 5 mm, for example between 0.8 and 4 mm or for example between 1 mm and 3.5 mm. The diameter of the filament can be chosen to feed a specific FFF 3D printer. An example of filament diameter used extensively in FFF process is 1.75 mm or 2.85 mm diameter. The accuracy of the filament diameter is +/−200 microns, for example +/−100 microns or +/−50 microns.

The filament of the present invention can be made from the part material by methods including, but not limited to, melt-mixing processes. Melt-mixing processes are typically carried out by heating the polymer components above the highest melting temperature and glass transition temperature of the thermoplastic polymers thereby forming a melt of the thermoplastic polymers. In some embodiments, the processing temperature ranges from about 280-450° C., preferably from about 290-440° C., from about 300-430° C. or from about 310-420° C.

The process for the preparation of the filament can be carried out in a melt-mixing apparatus, for which any melt-mixing apparatus known to the one skilled in the art of preparing polymer compositions by melt mixing can be used. Suitable melt-mixing apparatus are, for example, kneaders, Banbury mixers, single-screw extruders, and twin-screw extruders. Preferably, use is made of an extruder fitted with means for dosing all the desired components to the extruder, either to the extruder's throat or to the melt. In the process for the preparation of the filament, the components of the part material, i.e. at least PPSU and optionally additives, are fed to the melt-mixing apparatus and melt-mixed in that apparatus. The components may be fed simultaneously as a powder mixture or granule mixer, also known as dry-blend, or may be fed separately.

The order of combining the components during melt-mixing is not particularly limited. In one embodiment, the component can be mixed in a single batch, such that the desired amounts of each component are added together and subsequently mixed. In other embodiments, a first sub-set of components can be initially mixed together and one or more of the remaining components can be added to the mixture for further mixing. For clarity, the total desired amount of each component does not have to be mixed as a single quantity. For example, for one or more of the components, a partial quantity can be initially added and mixed and, subsequently, some or all of the remainder can be added and mixed.

The method for manufacturing the filaments also comprises a step of extrusion, for example with a die. For this purpose, any standard molding technique can be used; standard techniques including shaping the polymer compositions in a molten/softened form can be advantageously applied, and include notably compression molding, extrusion molding, injection molding, transfer molding and the like. Extrusion molding is preferred. Dies may be used to shape the articles, for example a die having a circular orifice if the article is a filament of cylindrical geometry.

The method may comprise if needed several successive steps of melt-mixing or extrusion under different conditions.

The process itself, or each step of the process if relevant, may also comprise a step consisting in a cooling of the molten mixture.

Support Material

The method of the present invention may also employ another polymeric component to support the 3D object under construction. This polymeric component, similar or distinct from the part material used to build a 3D object, is hereby called support material. Support material may be required during 3D printing to provide vertical and/or lateral support in the higher operating conditions required for the high-temperature part materials (e.g. part materials requiring a processing temperature around 320-400° C.).

The support material, possibly used in the context of the present method, advantageously possesses a high melting temperature (i.e. above 260° C.), in order to resist high temperature applications. The support material may also possess a water absorption behaviour or a solubility in water at a temperature lower than 110° C., in order sufficiently swell or deform upon exposure to moisture.

According to an embodiment of the present invention, the method for manufacturing a three-dimensional object with an additive manufacturing system further comprises the steps of:
  printing layers of a support structure from the support material, and
  removing at least a portion of the support structure from the three-dimensional object.

A variety of polymeric components can be used as a support material. Notably, support material can comprise polyamides or copolyamides, such as for example the ones described in PCT applications WO 2017/167691 and WO 2017/167692.

Applications

The present invention also relates to the use of a part material comprising a polymeric component as above-described for the manufacture of three-dimensional objects.

The present invention also relates to the use of a filament material comprising a polymeric component as above-described for the manufacture of three-dimensional objects.

All of the embodiments described above with respect to the part material do apply equally to the use of the part material or the use of the filament material.

The present invention also relates to the use of a part material comprising a polymeric component as above-described for the manufacture of a filament for use in the manufacture of three-dimensional objects.

The present invention also relates to 3D objects or 3D articles obtainable, at least in part, from the method of manufacture of the present invention, using the part material herein described. These 3D objects or 3D articles present a density comparable to injection molded objects or articles. They also present comparable or improved mechanical properties, notably stiffness (measured as the modulus of elasticity) and tensile strength.

The 3D objects or articles obtainable by such method of manufacture can be used in a variety of final applications. Mention can be made in particular of implantable device, dental prostheses, brackets and complex shaped parts in the aerospace industry and under-the-hood parts in the automotive industry.

EXAMPLES

The invention will be now described in more detail with reference to the following examples, whose purpose is merely illustrative and not intended to limit the scope of the invention.

Starting Materials

The following polymers were used to prepare filaments:

Polymer P1: Primospire® PR-250 polyphenylene polymer from Solvay Specialty Polymers PH: Ultem® 1010, available from Sabic PPSU #1: a poly(biphenyl ether sulfone) (PPSU) with a Mw of 50,500 g/mol, prepared according to the following process: The synthesis of the PPSU was achieved by the reaction in a 1 L flask of 83.8 g of 4,4'-biphenol (0.450 mol), 131.17 g of 4,4'-dichlorodiphenyl sulfone (0.457 mol) dissolved in a mixture of 400 g of sulfolane with the addition of 66.5 g (0.481 mol) of dry $K_2CO_3$.

The reaction mixture was heated up to 210° C. and maintained at this temperature until the polymer had the expected Mw. An excess of methyl chloride was then added to the reaction.

The reaction mixture was diluted with 600 g of MCB. The poly(biphenyl ether sulfone) was recovered by filtration of the salts, coagulation, washing and drying. The GPC analysis showed a number average molecular weight (Mw) of 50,500 g/mol, an average molecular weight (Mn) of 21,500 g/mol and PDI index is 2.35.

PPSU #2: a poly(biphenyl ether sulfone) (PPSU) with a Mw of 55,000 g/mol, a Mn of 22,000 g/mol and PDI index is 2.5, prepared according to the same process than PPSU #1, except that the reaction was stopped later.

Irganox® 1010 hindered phenol, product of Clariant.

AMERILUBES XL-165K lubricant, product of Amerilubes.

Blend Compounding

Each formulation was melt compounded using a 26 mm diameter Coperion® ZSK-26 co-rotating partially intermeshing twin screw extruder having an L/D ratio of 48:1. The barrel sections 2 through 12 and the die were heated to set point temperatures as follows:

Barrels 2-6: 190 to 300° C.
Barrels 7-12: 300 to 320° C.
Die: 330° C.

In each case, the resin blends were fed at barrel section 1 using a gravimetric feeder at throughput rates in the range 30-35 lb/hr. The extruder was operated at screw speeds of around 165 RPM. Vacuum was applied at barrel zone 10 with a vacuum level of about 27 inches of mercury. A single-hole die was used for all the compounds to give a strand approximately 2.6 to 2.7 mm in diameter and the polymer strand exiting the die was cooled in water and fed to the pelletizer to generate pellets approximately 2.7 mm in length. Pellets were dried at 140° C. for 16 h under vacuum prior to filament processing (FFF, according to the invention) or injection molding (IM, comparative examples).

Filament Preparation

Filaments of diameter of 1.75 mm were prepared for each neat polymer and each blend (see Table 1) using a Brabender® Intelli-Torque Plasti-Corde® Torque Rheometer extruder equipped with a 0.75" 32 L/D general purpose single screw, a filament head adapter, a 2.5-mm nozzle and ESI-Extrusion Services downstream equipment comprising a cooling tank, a belt puller, and a Dual Station Coiler. A Beta LaserMike® DataPro 1000 was used to monitor filament dimensions. The melt strands were cooled with air. The Brabender® zone set point temperatures were as follows: zone 1, 350° C.; zone 2, 340° C.; zones 3 and 4, 330° C. The Brabender® speed ranged from 30 to 50 rpm and the puller speed from 23 to 37 fpm.

Fused Filament Fabrication Bars (FFF Bars)

Test bars (i.e. ASTM D638 Type V bars) were printed from the above filaments of 1.75 mm in diameter on a Hyrel 3D Hydra 430 printer equipped with a 0.6 mm diameter nozzle. Bars were oriented in the XY direction on the build platform during printing. Test bars were printed with a 10 mm-wide brim and three perimeters. The tool path was a cross-hatch pattern with a 45° angle with respect to the long axis of the part. The build plate temperature for all bars was 180° C. The nozzle and extruder temperature was varied from 350° C. to 385° C. The speed of the nozzle was maintained at 40 mm/s except for the first layer which was printed at 20 mm/s. The first layer height in each case was 0.3 mm, with subsequent layers deposited at 0.1 mm height and 100% fill density. The observation of poor printing was made when printing gave bars with obvious gaps and macroscopic voids in material in the majority of layers. Mechanical properties of bars printed poorly were not measured.

Test Methods

Weight Average Molecular Weight (Mw) and Number Average Molecular Weight (Mn) of the PPSU Polymers The molecular weight was measured by gel permeation chromatography (GPC), using methylene chloride as a mobile phase. Two 5 µL mixed D columns with guard column from Agilent Technologies were used for separation. An ultraviolet detector of 254 nm was used to obtain the chromatogram. A flow rate of 1.5 ml/min and injection volume of 20 µL of a 0.2 w/v % solution in mobile phase was selected. Calibration was performed with 12 narrow molecular weight polystyrene standards (Peak molecular weight range: 371,000 to 580 g/mol). The weight average molecular weight (Mw) and number average molecular weight (Mn) was reported.

Printing Quality and Impact Strength

Notched impact strength was determined according to the ASTM D256 method using a 2-ftlb hammer.

Tensile Strength

Tensile strength and modulus were determined according to the ASTM D638 method with Type V bars.

The test bars (according to the present invention or comparative) and their mechanical properties are reported in Table 1 below (5 test bars/mean value).

TABLE 1

|  | 1 | 2 | 3 | 4 |
|---|---|---|---|---|
| C : comparative | C | C | I | I |
| I : according to the invention |  |  |  |  |
| Polymer (P1) | 100 |  | 10 | 25 |
| PEI |  |  |  |  |
| PPSU #1 |  | 100 | 90 | 75 |
| PPSU #2 |  |  |  |  |
| Irganox ® 1010 | 0.5 | 0.3 | 0.3 | 0.3 |
| Amerilube | 0.5 |  |  |  |
| Process | FFF | FFF | FFF | FFF |
| Printing quality | − | + | + | + |
| Modulus of Elasticity (GPa) | NR | 1.76 | 2.14 | 2.48 |
| Tensile Strength at Yield (MPa) | NR | 62 | 69 | 75 |
| Nominal Tensile Strain at Break (%) | NR | 21 | 16 | 17 |
| Testing Speed (in/min) | 0.05 | 0.05 | 0.05 | 0.05 |

TABLE 2

|  | 5 | 6 | 7 |
|---|---|---|---|
| C : comparative | I | I | I |
| I : according to the invention |  |  |  |
| Polymer (P1) | 25 | 50 | 75 |
| PEI | 75 |  | 25 |
| PPSU #1 |  |  |  |
| PPSU #2 |  | 50 |  |
| Irganox ® 1010 | 0.3 | 0.3 | 0.3 |
| Process | FFF | FFF | FFF |
| Printing quality | + | + | + |
| Modulus of Elasticity (GPa) | 3.12 | 3.34 | 4.0 |
| Tensile Strength at Yield (MPa) | 103 | 98 | 120 |
| Nominal Tensile Strain at Break (%) | 9 | 16 | 12 |
| Testing Speed (in/min) | 0.05 | 0.05 | 0.05 |

NR: not measured as being non relevant

The weight percentages of polymer (P1), PEI and PPSU are based on the total weight of the polymeric component. The weight percentages of the antioxidant and lubricant are based on the total weight of the composition.

According to the literature (e.g. Stratasys TDS), the mechanical properties of PEI printed bars is low compared to all the inventive composition of the invention, more precisely:

Modulus of Elasticity (GPa): 2.77
Tensile Strength at Yield (MPa): 64
Nominal Tensile Strain at Break (%): 3.3%

The printing quality is assessed according to two criteria, the appearance of macroscopic voids during printing and the appearance of the fracture surface produced in the Notched Impact test:

(−) means that the test bar could not be printed without the occurrence of macroscopic voids utilizing multiple tool path speeds and extrusion temperatures or that the sample fracture surface presents inter-layer delamination;

(+) means that the sample breaks according to a pattern similar to injection molded parts.

As shown in Table 1, it was not possible to print test bars of reasonable quality by FFF using filaments of polymer (P1). Filaments of PPSU #1 yielded good quality bars, but the bars exhibited low elastic modulus and strength, limiting the usefulness of the material in applications where these properties are important (the same holds true with filaments of polymer PPSU #2, results not shown in Table 1).

The test bars of example 3 and 4 (obtained by FFF with a filament of polymer (P1)/PPSU) yielded good quality bars, exhibit a good modulus of elasticity and a tensile strength that are higher than the test bars of example 2 (obtained by FFF with a filament of neat PPSU).

The test bars of examples 5 and 7 (obtained by FFF with a filament of polymer (P1)/PEI) yielded good quality bars, exhibit a good modulus of elasticity and a tensile strength that are higher than the test bars of example 2 (obtained by FFF with a filament of neat PPSU).

The test bars of example 6, obtained by FFF with a filament of 50 wt. % of polymer (P1) and 50 wt. % of PPSU, yielded good quality bars, exhibit a good modulus of elasticity and a tensile strength that are higher than the test bars of example 2 (obtained by FFF with a filament of neat PPSU).

The present examples demonstrate that the combination of polymer (P1) with PPSU polymer (two different Mw) or the combination of polymer (P1) with PEI is therefore well-suited to the requirements of Fused Filament Fabrication according to the present invention.

The invention claimed is:

1. A method for manufacturing a three-dimensional (3D) object with an additive manufacturing system, comprising a step consisting in printing layers of the 3D object from a part material comprising a polymeric component comprising, based on the total weight of the polymeric component:
from 5 to 95 wt. % of at least one polymer (P1) comprising at least 50 mol. % of recurring units (R1) consisting of an arylene group comprising at least one benzene ring, each recurring unit (R1) being bound to each other through C—C bonds, wherein the recurring units (R1) are such that, based on the total number of moles of recurring units (R1):
less than 90 mol. % are arylene units (R1-a),
at least 10 mol. % are arylene units (R1-b),
wherein (R1-a) is 1,4-phenylene and (R1-b) is 1,3-phenylene; and
wherein (R1-a) and (R1-b) are substituted or unsubstituted, and
from 5 to 95 wt. % of at least one polymer (P2), having a glass transition temperature (Tg) between 140° C. and 265° C., and no melting peak, as measured by differential scanning calorimetry (DSC) according to ASTM D3418.

2. The method of claim 1, wherein the polymeric component of the part material comprises:
from 5 to 50 wt. % of at least polymer (P1), and
from 50 to 95 wt. % of at least polymer (P2).

3. The method of claim 1, wherein the part material also comprises up to 60 wt. %, based on the total weight of the part material, of at least one additive selected from the group consisting of fillers, colorants, lubricants, plasticizers, flame retardants, nucleating agents, flow enhancers and stabilizers.

4. The method of claim 1, wherein P2 is selected from the group consisting of poly(aryl ether sulfone) (PAES) and poly(ether imide) (PEI).

5. The method of claim 1, wherein P2 is a poly(biphenyl ether sulfone) (co)polymer (PPSU).

6. The method of claim 1, wherein P2 is a poly(biphenyl ether sulfone) (co)polymer (PPSU) of Mw ranging from 30,000 to 80,000 g/mol.

7. The method of claim 1, wherein the part material is in the form of a filament or pellets.

8. The method of claim 1, wherein the step of printing layers comprises extruding the part material.

9. The method of claim 1, wherein P2 is a poly(biphenyl ether sulfone) (co)polymer (PPSU) comprising at least 50 mol. % of recurring units ($R_{PPSU}$) of formula (K), the mol. % being based on the total number of moles in the polymer:

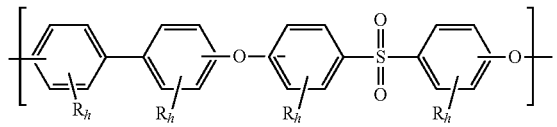

where
R, at each location, is independently selected from a halogen, an alkyl, an alkenyl, an alkynyl, an aryl, an ether, a thioether, a carboxylic acid, an ester, an amide, an imide, an alkali or alkaline earth metal sulfonate, an alkyl sulfonate, an alkali or alkaline earth metal phosphonate, an alkyl phosphonate, an amine, and a quaternary ammonium; and
h, for each R, is independently zero or an integer ranging from 1 to 4.

10. A part material for manufacturing a three-dimensional (3D) object with an additive manufacturing system, comprising a polymeric component comprising, based on the total weight of the polymeric component:
from 5 to 95 wt. % of at least one polymer (P1) comprising at least 50 mol. % of recurring units (R1) consisting of an arylene group comprising at least one benzene ring, each recurring unit (R1) being bound to each other through C—C bonds, wherein the recurring units (R1) are such that, based on the total number of moles of recurring units (R1):
less than 90 mol. % are arylene units (R1-a),
at least 10 mol. % are arylene units (R1-b),
wherein (R1-a) is 1,4-phenylene and (R1-b) is 1,3-phenylene; and
wherein (R1-a) and (R1-b) are substituted or unsubstituted; and
from 5 to 95 wt. % of at least one polymer (P2), having a glass transition temperature (Tg) between 140° C. and 265° C., and no melting peak, as measured by differential scanning calorimetry (DSC) according to ASTM D3418.

11. The part material of claim 10, wherein P2 is selected from the group consisting of poly(aryl ether sulfone) (PAES) and poly(ether imide) (PEI).

12. A process for manufacturing three-dimensional objects, comprising using a part material comprising a polymeric component comprising, based on the total weight of the polymeric component:
from 5 to 95 wt. % of at least one polymer (P1) comprising at least 50 mol. % of recurring units (R1) consisting of an arylene group comprising at least one benzene ring, each recurring unit (R1) being bound to each other through C—C bonds, wherein the recurring units (R1) are such that, based on the total number of moles of recurring units (R1):
less than 90 mol. % are arylene units (R1-a), and
at least 10 mol. % are arylene units (R1-b),
wherein (R1-a) is 1,4-phenylene and (R1-b) is 1,3-phenylene; and
wherein (R1-a) and (R1-b) are substituted or unsubstituted, and
from 5 to 95 wt. % of at least one polymer (P2), having a glass transition temperature (Tg) between 140° C. and 265° C., and no melting peak, as measured by differential scanning calorimetry (DSC) according to ASTM D3418.

13. The process of claim 12, wherein the part material is in the form of a filament or pellets.

14. The method of claim 1, wherein P1 comprises at least 90 mol % of R1.

15. The method of claim 1, wherein P1 comprises at least 95 mol % of R1.

16. The method of claim 1, wherein P1 comprises at least 99 mol % of R1.

17. The method of claim 1, wherein P1 is a homopolymer consisting of 100 mol % of R1.

18. The method of claim 1, wherein the arylene group is substituted by a monovalent substituting group.

19. The method of claim 18, wherein the monovalent substituting group is selected from the group consisting of: hydrocarbylketones [—C(=O)—R, where R is a hydrocarbyl group], and hydrocarbyloxyhydrocarbylketones [—C(=O)—R$_1$—O—R$_2$ where R$_1$ is a divalent hydrocarbon group and R$_2$ is a hydrocarbon group].

20. The method of claim 1, wherein P2 is a poly(biphenyl ether sulfone) (PPSU) comprising at least 50 mol % of recurring units (R$_{PPSU}$) of formula (L"):

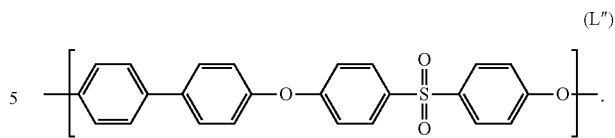

21. The method of claim 1, wherein P2 is a poly(biphenyl ether sulfone) (PPSU) comprising at least 95 mol % of recurring units (R$_{PPSU}$) of formula (L"):

(L")

22. The method of claim 1, wherein P2 is a poly(biphenyl ether sulfone) (PPSU) comprising at least 99 mol % of recurring units (R$_{PPSU}$) of formula (L"):

(L")

23. The part material of claim 10, wherein P1 comprises at least 90 mol % of R1.

24. The part material of claim 10, wherein P1 comprises at least 95 mol % of R1.

25. The part material of claim 10, wherein P1 comprises at least 99 mol % of R1.

26. The part material of claim 10, wherein P1 is a homopolymer consisting of 100 mol % of R1.

27. The part material of claim 10, wherein the arylene group is substituted by a monovalent substituting group.

28. The part material of claim 27, wherein the monovalent substituting group is selected from the group consisting of: hydrocarbylketones [—C(=O)—R, where R is a hydrocarbyl group], and hydrocarbyloxyhydrocarbylketones [—C(=O)—R$_1$—O—R$_2$ where R$_1$ is a divalent hydrocarbon group and R$_2$ is a hydrocarbon group].

29. The part material of claim 10, wherein P2 is a poly(biphenyl ether sulfone) (PPSU) comprising at least 95 mol % of recurring units (R$_{PPSU}$) of formula (L"):

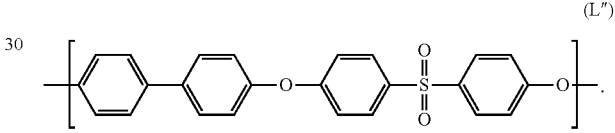

30. The part material of claim 10, wherein P2 is a poly(biphenyl ether sulfone) (PPSU) comprising at least 99 mol % of recurring units (R$_{PPSU}$) of formula (L"):

(L")

* * * * *